(12) United States Patent
Naito

(10) Patent No.: US 12,143,722 B2
(45) Date of Patent: Nov. 12, 2024

(54) IMAGE STABILIZATION CONTROL APPARATUS, IMAGING APPARATUS, LENS APPARATUS, AND CONTROL METHOD

(71) Applicant: CANON KABUSHIKI KAISHA, Tokyo (JP)

(72) Inventor: Go Naito, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 67 days.

(21) Appl. No.: 17/820,065

(22) Filed: Aug. 16, 2022

(65) Prior Publication Data

US 2023/0239572 A1 Jul. 27, 2023

(30) Foreign Application Priority Data

Jan. 24, 2022 (JP) ................. 2022-008838

(51) Int. Cl.
*H04N 23/68* (2023.01)
(52) U.S. Cl.
CPC ....... *H04N 23/683* (2023.01); *H04N 23/6811* (2023.01)
(58) Field of Classification Search
CPC ............. H04N 23/683; H04N 23/6811; H04N 23/667; H04N 23/6812; H04N 23/687
See application file for complete search history.

(56) References Cited

U.S. PATENT DOCUMENTS

2021/0297594 A1* 9/2021 Usami ................ H04N 23/695
2022/0385800 A1* 12/2022 Naito ..................... H04N 23/73

FOREIGN PATENT DOCUMENTS

JP 2006113468 A 4/2006

\* cited by examiner

*Primary Examiner* — Twyler L Haskins
*Assistant Examiner* — Angel L Garces-Rivera
(74) *Attorney, Agent, or Firm* — Canon U.S.A., Inc. IP Division

(57) ABSTRACT

An image stabilization control apparatus includes at least one processor or circuit which functions as an obtaining unit configured to obtain resolving power of an imaging system, a control unit configured to control a correction unit configured to correct an effect of shake acting on an imaging apparatus to which the lens apparatus is attached on the captured image, and a setting unit configured to set responsiveness of the correction unit controlled by the control unit based on the resolving power of the imaging system and an imaging condition, wherein the setting unit is configured to, in a case where the imaging condition satisfies a predetermined condition and the resolving power of the imaging system has a first value, set the responsiveness of the correction unit to be higher than in a case where the resolving power has a second value less than the first value.

22 Claims, 16 Drawing Sheets

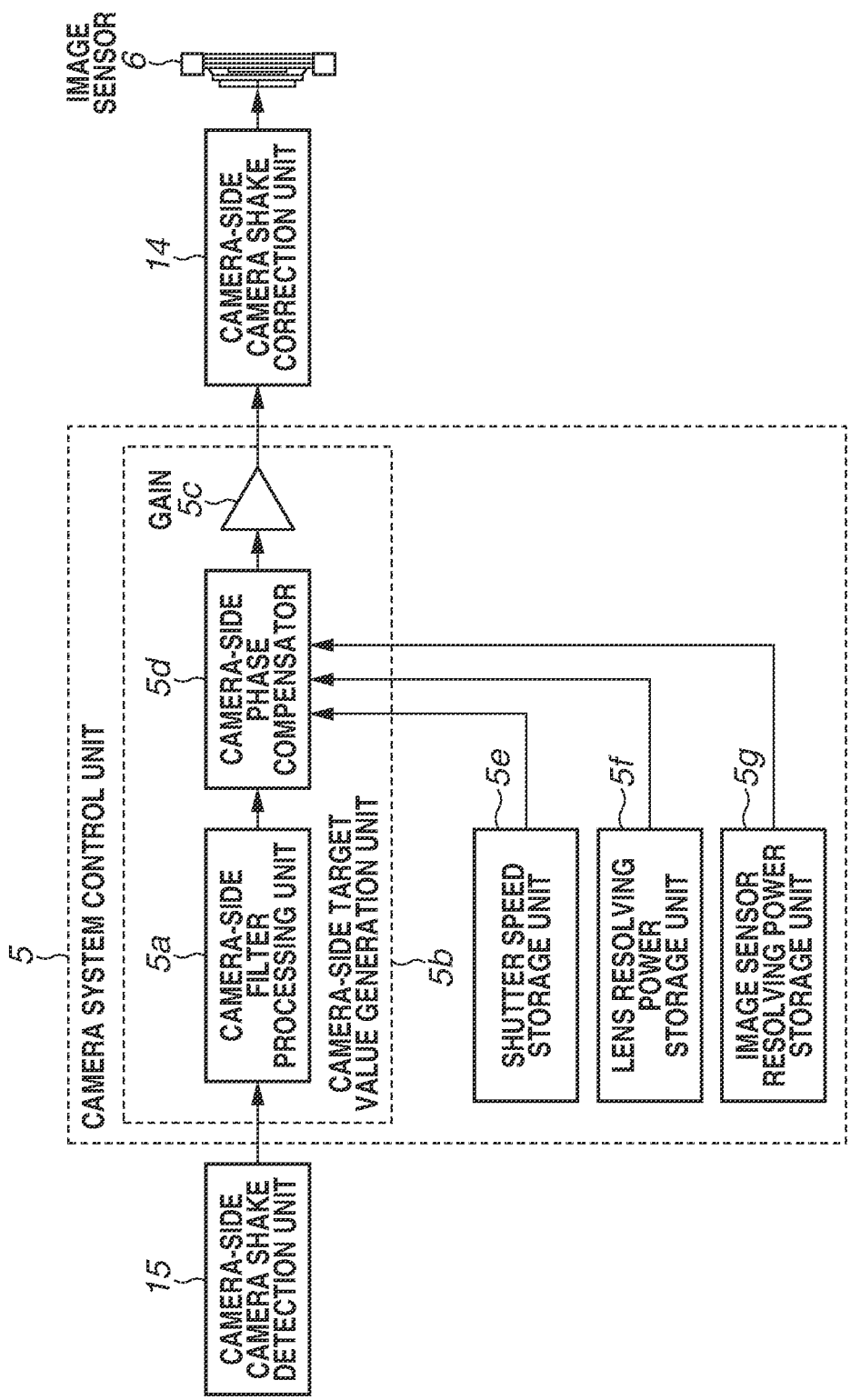

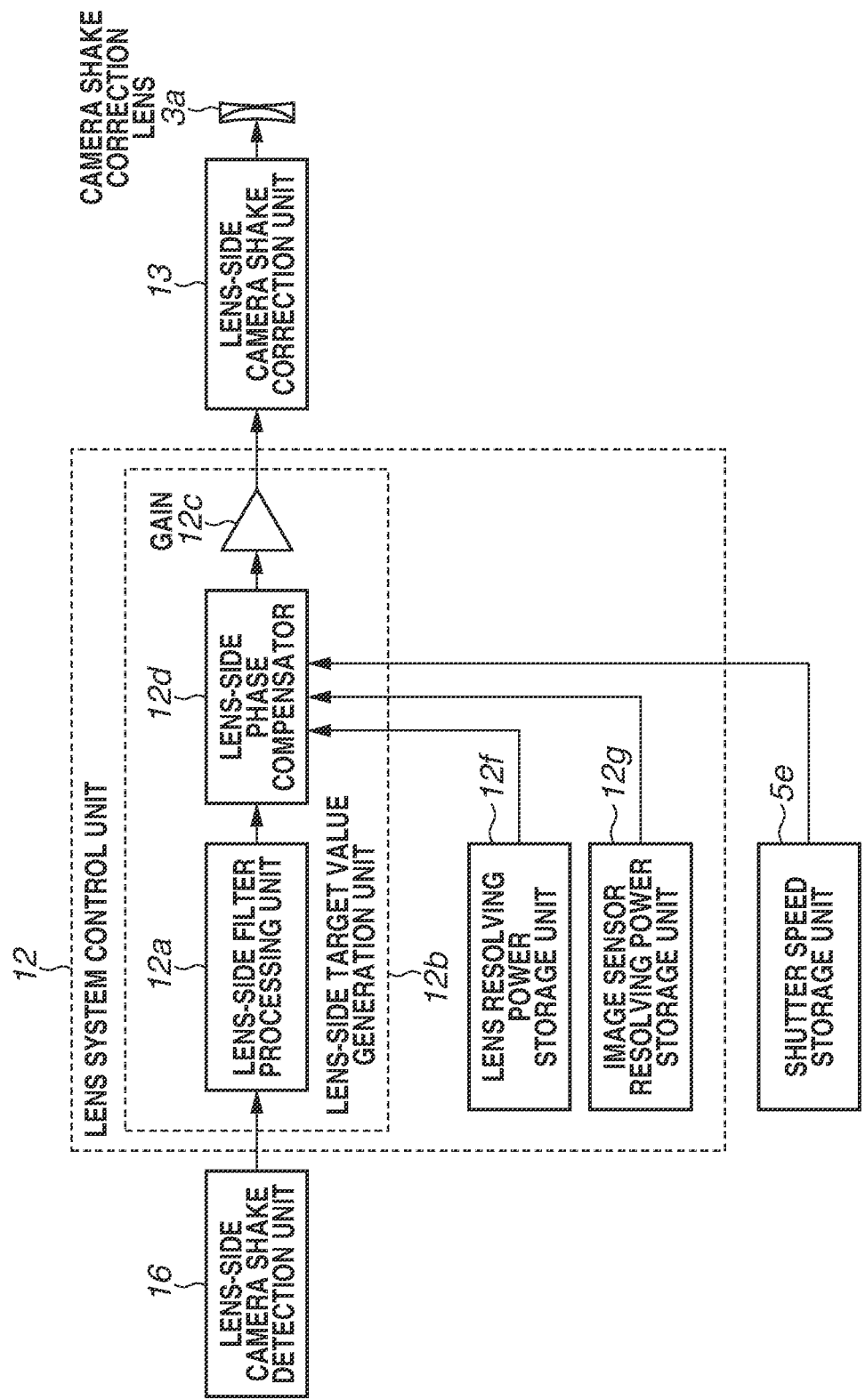

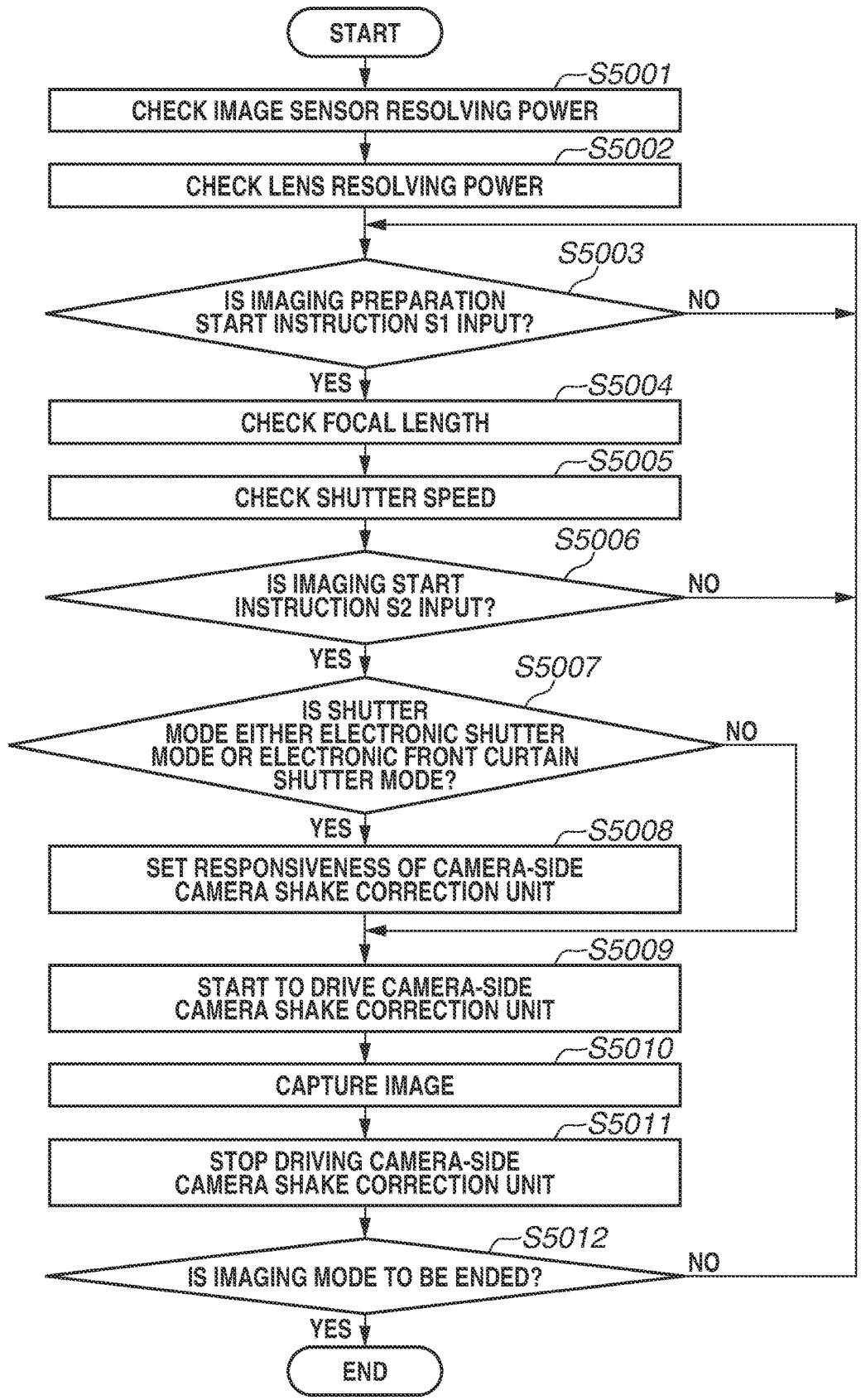

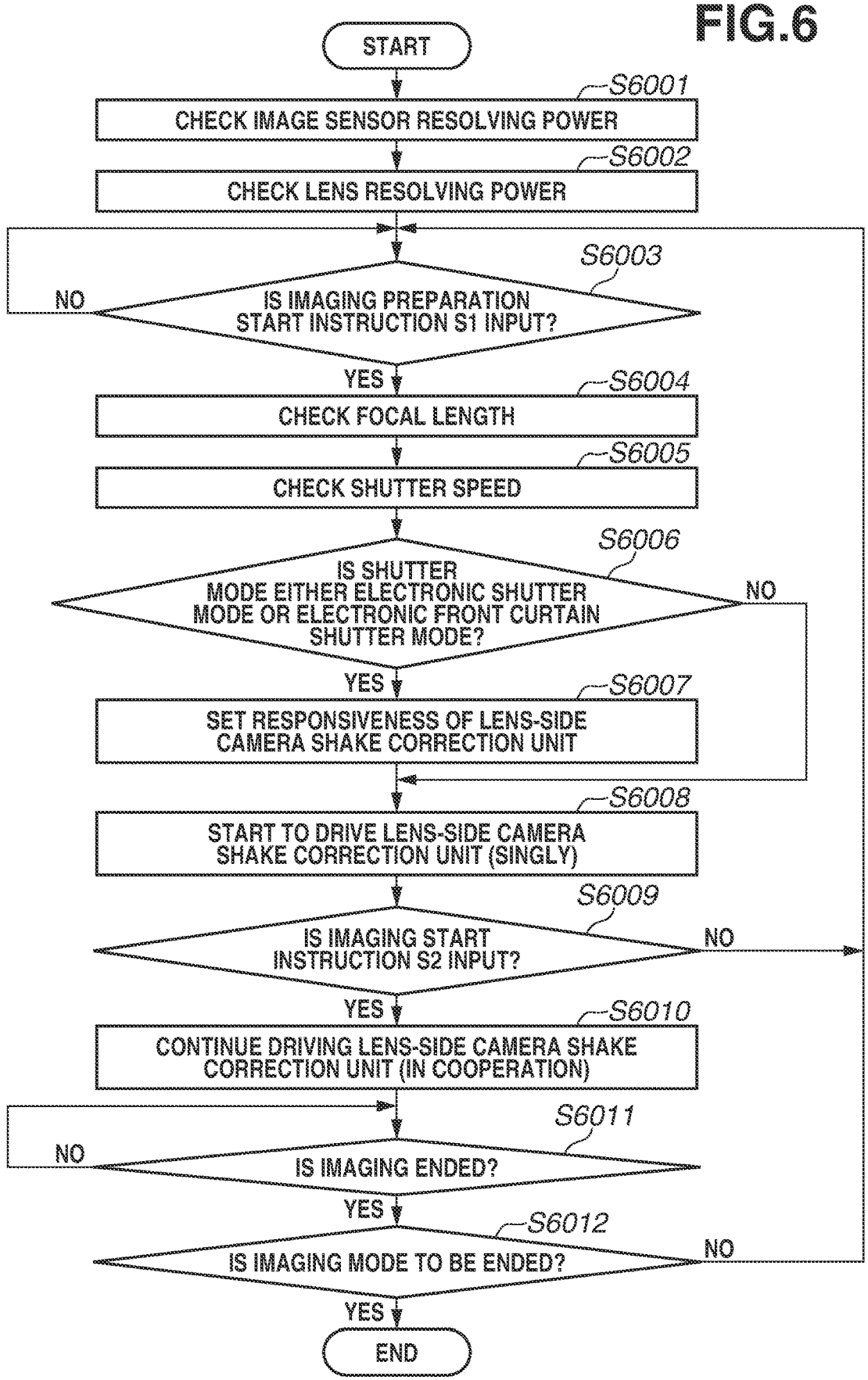

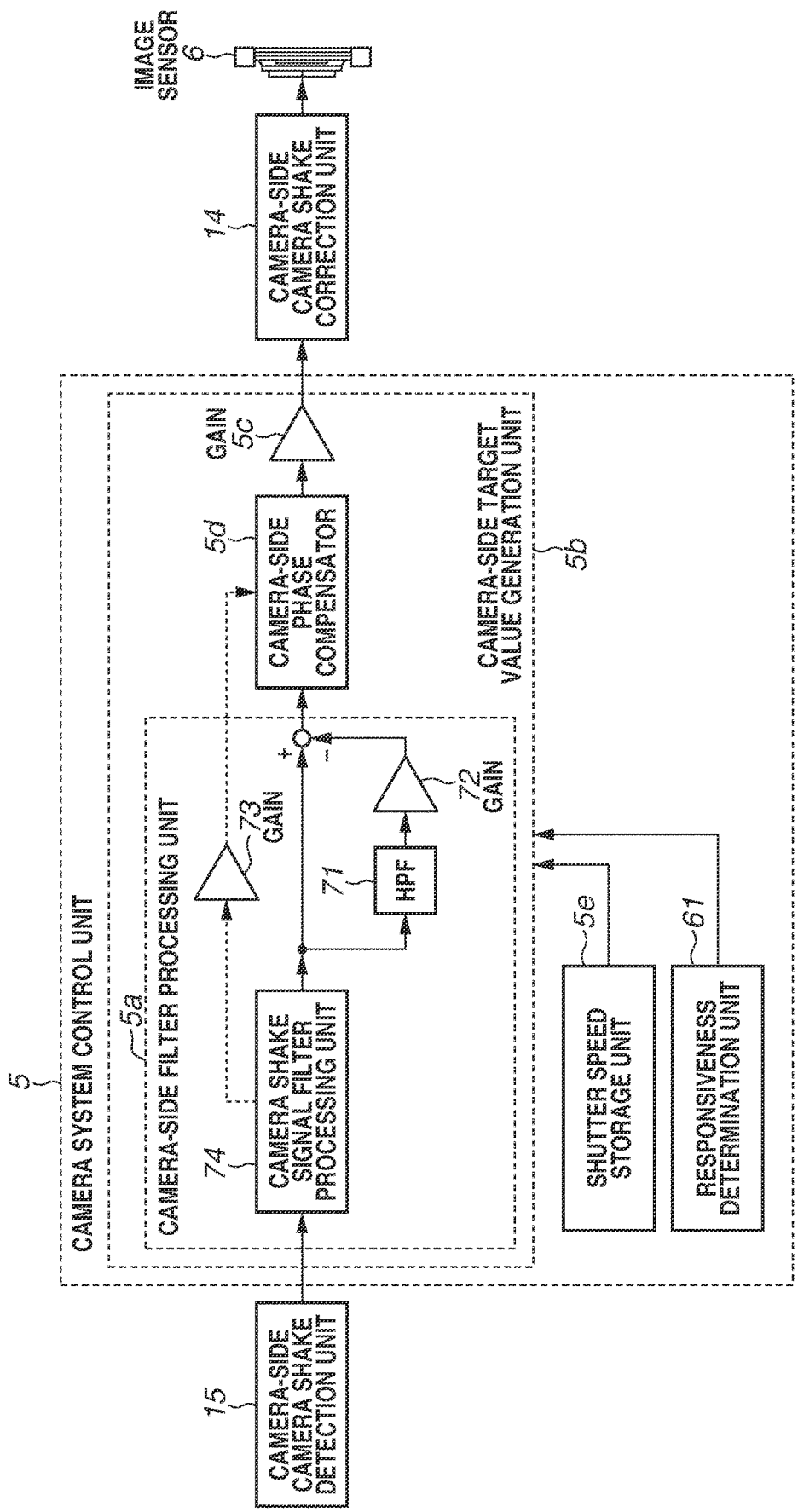

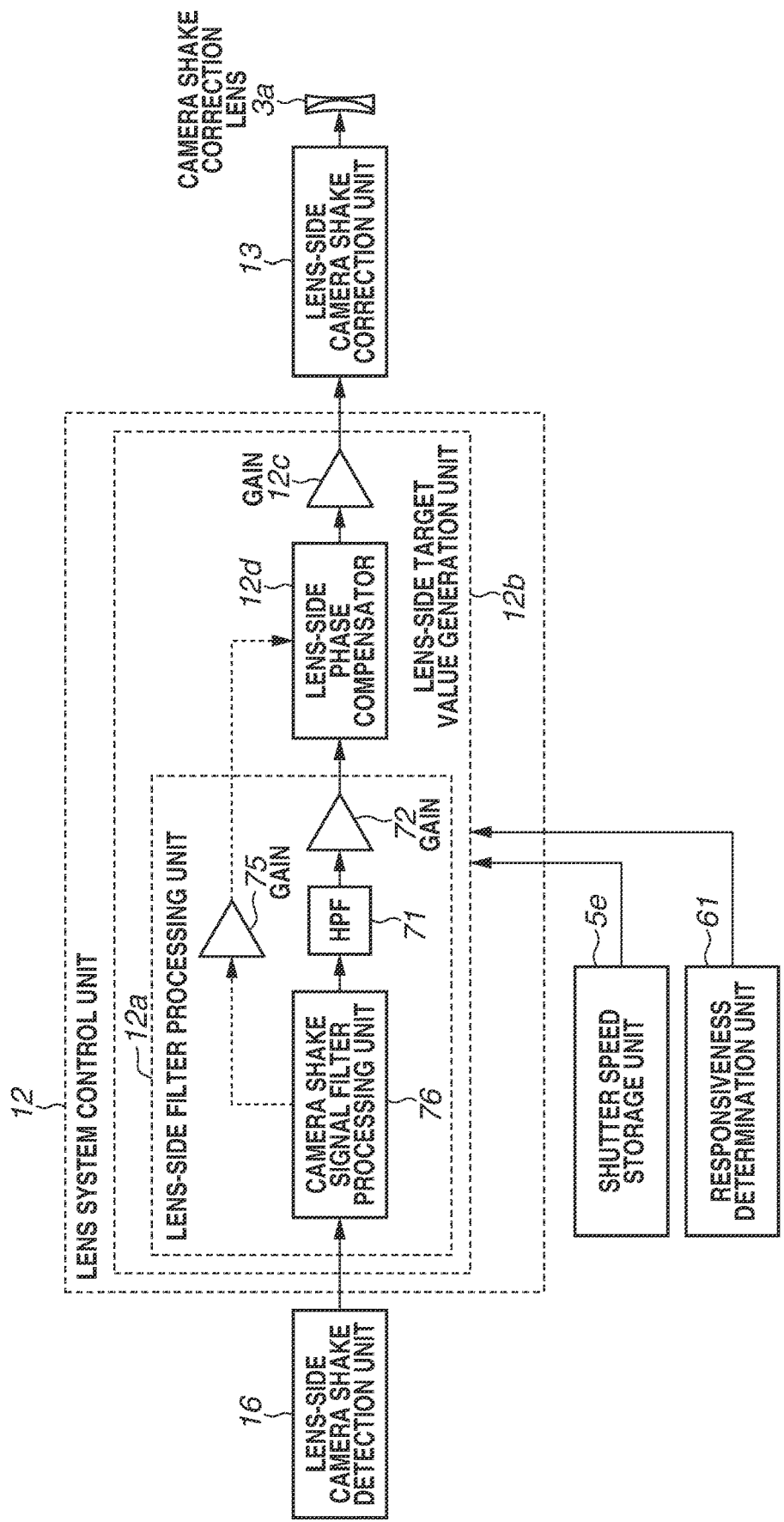

IMAGE STABILIZATION CONTROL APPARATUS, IMAGING APPARATUS, LENS APPARATUS, AND CONTROL METHOD

BACKGROUND OF THE INVENTION

Field of the Invention

The aspect of the embodiments relates to an image stabilization control apparatus of an imaging system including a unit for correcting blur during imaging.

Description of the Related Art

With the recent sophistication of imaging apparatuses, more and more imaging apparatuses and imaging lenses are being equipped with a blur correction mechanism (image stabilization mechanism). The blur correction mechanism can reduce the effect of shake on a captured image when a user captures the image with the imaging apparatus held in the user's hand. There have been discussed several types of system of the blur correction mechanism for use in imaging apparatuses. Examples include a system where the effect of shake is corrected by driving (displacing) some of the lenses in an imaging optical system, and a system where the effect of shake is corrected by driving (displacing) an image sensor in a camera main body. With respect to an interchangeable-lens imaging apparatus, the former is to correct the effect of shake by driving some of the lenses in the imaging optical system in the interchangeable lens apparatus, and the latter is to correct the effect of shake by driving the image sensor in the camera main body. A system combining both, where some of the lenses in the imaging optical system and the image sensor are both driven for the effect of shake correction, have also been known.

Japanese Patent Application Laid-Open No. 2006-113468 discusses a technique for selecting a system for the effect of shake correction from among the systems for driving some of the lenses in the imaging optical system, driving the image sensor, and driving both, based on resolving power of the imaging lens.

It is commonly held that the effect of shake appears significantly on a captured image if the image is captured at a shutter speed slower than 1/(focal length). For example, in capturing an image using an imaging optical system with a focal length of 80 mm, the effect of shake is said to appear on the captured image if the image is captured at a shutter speed slower than 1/80 sec.

SUMMARY OF THE INVENTION

According to an aspect of the embodiments, an image stabilization control apparatus includes at least one processor or circuit which functions as an obtaining unit configured to obtain resolving power of an imaging system based on information indicating resolving power of an imaging optical system included in a lens apparatus and information indicating resolving power of an image sensor configured to capture an object image formed by the lens apparatus, a control unit configured to control a correction unit configured to correct an effect of shake acting on an imaging apparatus to which the lens apparatus is attached on the captured image, and a setting unit configured to set responsiveness of the correction unit controlled by the control unit based on the resolving power of the imaging system and an imaging condition, wherein the setting unit is configured to, in a case where the imaging condition satisfies a predetermined condition and the resolving power of the imaging system has a first value, set the responsiveness of the correction unit to be higher than in a case where the resolving power has a second value less than the first value.

Further features of the disclosure will become apparent from the following description of exemplary embodiments with reference to the attached drawings.

BRIEF DESCRIPTION OF THE DRAWINGS

FIG. 2A is a block diagram of a camera-side camera shake correction system according to the first exemplary embodiment.

FIG. 2B is a block diagram of a lens-side camera shake correction system according to the first exemplary embodiment.

FIG. 5 is a control flowchart according to the first exemplary embodiment.

FIG. 6 is a control flowchart according to the first exemplary embodiment.

FIG. 7A is a block diagram of a camera-side camera shake correction system according to a second exemplary embodiment of the disclosure.

FIG. 7B is a block diagram of a lens-side camera shake correction system according to the second exemplary embodiment of the disclosure.

DESCRIPTION OF THE EMBODIMENTS

With the sophistication of imaging apparatuses, image sensors are increasing in the number of pixels, and imaging lenses are increasing in resolving power. Moreover, chances to view captured images on a screen of a personal computer (PC) or a smartphone have been increasing in recent years. It has been found that there is an issue of possibility that small blur on the image sensor surface can be observed in a case where an image captured using an imaging apparatus and/or lens apparatus having high resolving power is enlarged and viewed on the smartphone screen.

In light of this, an image stabilization control apparatus that can reduce an effect of shake even under the condition where a captured image can be affected by small shake will be described.

Exemplary embodiments of the disclosure will be described in detail below with reference to the attached drawings. It should be noted that the following exemplary embodiments are not intended to limit the disclosure set forth in the claims. While a plurality of features is described in the following exemplary embodiments, all of the plurality of features is not necessarily indispensable to the disclosure, and the features may be combined as appropriate. In the attached drawings, the same or similar components are denoted by the same reference numbers. A redundant description thereof will be omitted.

Figure 1A:
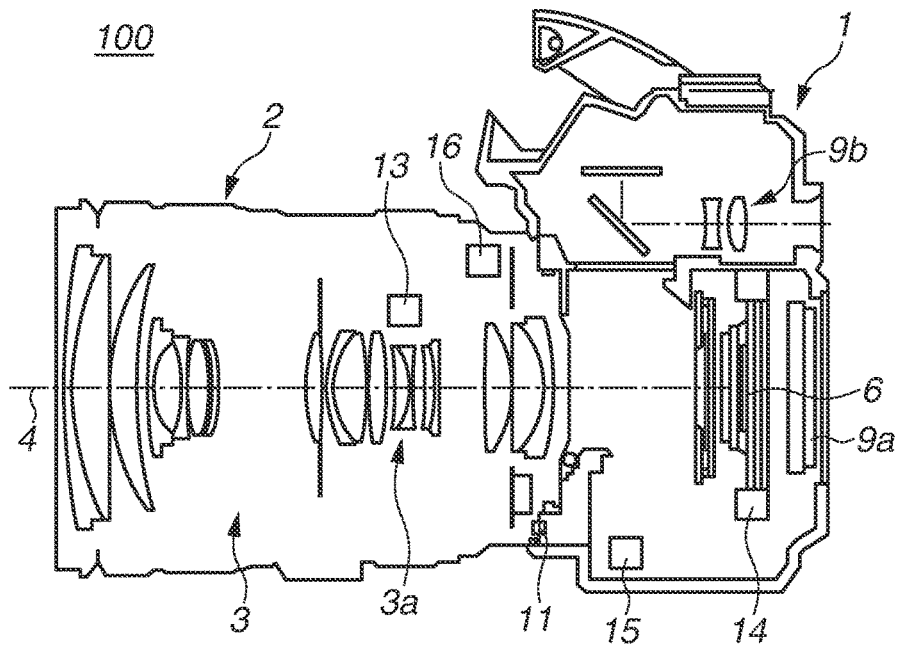
FIG. 1A is a central sectional view of an imaging system according to a first exemplary embodiment.
Figure 1B:
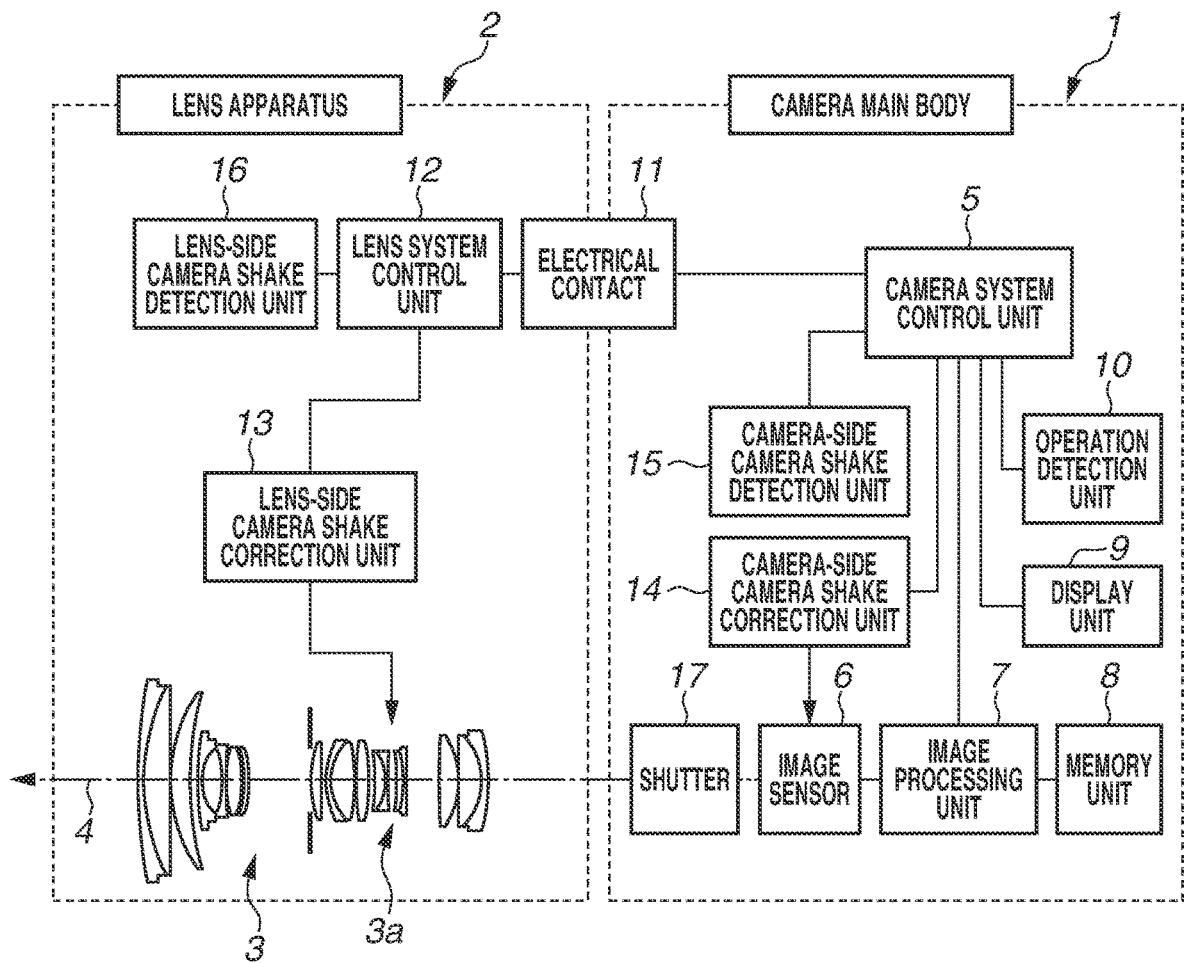
FIG. 1B is a block diagram of the imaging system according to the first exemplary embodiment.

An imaging system according to a first exemplary embodiment of the disclosure will be described below with reference to FIGS. 1A to 5. FIGS. 1A and 1B are schematic diagrams for describing a configuration of an imaging system 100 according to the present exemplary embodiment. FIG. 1A is a central sectional view of the imaging system 100. FIG. 1B is a block diagram illustrating an electrical configuration of the imaging system 100.

As illustrated in FIG. 1A, the imaging system 100 according to the present exemplary embodiment includes a camera main body (imaging apparatus) 1 and a lens apparatus 2 attachable to the camera main body 1. The imaging system 100 is what is called an interchangeable-lens single-lens camera, and configured so that various interchangeable lenses can be detachably attached via a circular mount block. The mount block includes electrical contacts 11. The lens apparatus 2 is attached to the camera main body 1 via the mount block, whereby the lens apparatus 2 and the camera main body 1 are communicably connected.

As illustrated in FIGS. 1A and 1B, the lens apparatus 2 includes an imaging optical system 3, a lens system control unit 12, a lens-side camera shake correction unit 13, and a lens-side camera shake detection unit 16. The imaging optical system 3 includes a plurality of lenses. The lens system control unit 12 controls operation of the entire lens apparatus 2. The lens-side camera shake correction unit 13 is an image stabilization unit in the lens apparatus 2. The lens-side camera shake correction unit 13 makes image stabilizations (hereinafter, may be referred to as camera shake corrections). The lens-side camera shake detection unit 16 detects a camera shake amount. The imaging optical system 3 includes a camera shake correction lens 3a that is an optical element for correcting camera shake. The lens-side camera shake correction unit 13 includes a support unit that supports the camera shake correction lens 3a, and an actuator. The lens-side camera shake correction unit 13 performs a camera shake correction operation for reducing the effect of camera shake on a captured image by driving the camera shake correction lens 3a on a plane perpendicular to an optical axis 4 of the imaging optical system 3 based on a detection result obtained by the lens-side camera shake detection unit 16. Aside from driving the camera shake correction lens 3a, the lens system control unit 12 can also drive a not-illustrated focus lens and diaphragm by using not-illustrated driving units.

The camera main body 1 includes a camera system control unit 5, an image sensor 6, and an image processing unit 7. The camera system control unit 5 controls the entire camera main body 1. The image sensor 6 captures an object image formed by the imaging optical system 3. The image processing unit 7 performs development processing and gamma processing on an electrical signal obtained by the image sensor 6. The electrical signal converted into a specific image format by the image processing unit 7 is stored in a memory unit 8 by the camera system control unit 5. The camera main body 1 further includes a display unit 9, a shutter 17 located in front of the image sensor 6, and an operation detection unit 10 for detecting signals from operation units including a not-illustrated shutter release button. The display unit 9 includes a rear display device 9a located at the rear of the camera main body 1, and an electronic viewfinder (EVF) 9b located in a viewfinder of the camera main body 1. The camera main body 1 further includes a camera-side camera shake detection unit 15 and a camera-side camera shake correction unit 14. The camera-side camera shake correction unit 14 is an image stabilization unit in the camera main body 1. The camera-side camera shake correction unit 14 corrects image shake by moving the image sensor 6 on a plane perpendicular to the optical axis 4 based on a camera shake detection result. The camera-side camera shake correction unit 14 includes a support unit that supports the image sensor 6, and an actuator. The camera-side camera shake correction unit 14 makes camera-side camera shake corrections by driving the actuator under the control of the camera system control unit 5 to move the image sensor 6 on the plane perpendicular to the optical axis 4.

The camera system control unit 5 and the lens system control unit 12 cooperate through communication via the electrical contacts 11, and perform driving control for reducing the effect of vibrations (camera shake) acting on the imaging system 100 using the camera-side camera shake correction unit 14 and the lens-side camera shake correction unit 13, respectively. In the present exemplary embodiment, the camera system control unit 5 will be described to control camera shake corrections of the entire imaging system 100 by transmitting instructions to the lens system control unit 12 and controlling the lens-side camera shake correction unit 13. Alternatively, the lens system control unit 12 may control the camera shake corrections of the entire imaging system 100 by transmitting instructions to the camera system control unit 5. The imaging system 100 may be configured to include either of the lens- and camera-side camera shake correction units 13 and 14.

With such a configuration, the imaging system 100 including the camera main body 1 and the lens apparatus 2 constitutes an imaging section, an image processing section, a recording and reproduction section, and a control section.

The imaging section includes the imaging optical system 3 and the image sensor 6. The image processing section includes the image processing unit 7. The recording and reproduction section includes the memory unit 8 and the display unit 9, and the display unit 9 includes the rear display device 9*a* and the EVF 9*b*. Similarly, the control section includes the camera system control unit 5, the operation detection unit 10, the camera-side camera shake detection unit 15, the camera-side camera shake correction unit 14, the lens system control unit 12, the lens-side camera shake detection unit 16, and the lens-side camera shake correction unit 13.

The camera-side camera shake detection unit 15 and the lens-side camera shake detection unit 16 can detect rotational camera shake (camera shake in a pitch direction and camera shake in a yaw direction) with respect to the optical axis 4, acting on the imaging system 100. Such detection is implemented by using a vibrating structure gyroscope, for example. The camera-side camera shake correction unit 14 and the lens-side camera shake correction unit 13 drive the image sensor 6 and the camera shake correction lens 3*a* on the respective planes perpendicular to the optical axis 4 based on rotational camera shake amounts detected by the camera-side camera shake detection unit 15 and the lens-side camera shake detection unit 16, respectively.

The camera-side camera shake detection unit 15 further includes an acceleration sensor, for example, and can detect translational camera shake acting on the imaging system 100. Thus, the camera-side camera shake correction unit 14 drives the image sensor 6 on the plane perpendicular to the optical axis 4 based on the rotational camera shake and the translational camera shake detected by the camera-side camera shake detection unit 15.

The imaging section described above is an optical processing system for forming an image of light from an object (object light) on the imaging plane of the image sensor 6 via the imaging optical system 3. A focus evaluation amount and an appropriate exposure amount can be obtained from the image sensor 6. Based on such signals (automatic focus (AF) signal and automatic exposure (AE) signal), the imaging optical system 3 is appropriately adjusted, whereby the image sensor 6 is exposed to an appropriate amount of object light and the object image is formed near the image sensor 6.

The image processing unit 7 includes an analog-to-digital (A/D) converter, a white balance adjustment circuit, a gamma correction circuit, and an interpolation calculation circuit, and can generate a recording image. The image processing unit 7 also includes a color interpolation processing unit, which generates a color image from Bayer arrangement signals by applying color interpolation (demosaicing) processing thereto. The image processing unit 7 also performs still image, moving image, and/or audio compression using a predetermined method.

The memory unit 8 includes nonvolatile and volatile memories. The image captured by the image sensor 6 is output to the memory unit 8 by the camera system control unit 5. An image to be presented to the user is displayed on the display unit 9.

The camera system control unit 5 individually controls an imaging system, an image processing system, and a recording and reproduction system in response to external operations. For example, if pressing of the not-illustrated shutter release button is detected by the operation detection unit 10, the camera system control unit 5 controls the driving of the image sensor 6 and the operation and compression processing of the image processing unit 7 by generating timing signals and outputting the timing signals to the shutter 17, the image sensor 6, and the image processing unit 7. The camera system control unit 5 further controls the state of segments of an information display device for displaying information, using the display unit 9. The rear display device 9*a* may be a touch panel and play the roles of both the display unit 9 and an operation unit.

An adjustment operation of the imaging optical system 3 by the control section will be described. The camera system control unit 5 is connected to the image processing unit 7, and determines an appropriate focal position and aperture position based on the signals from the image sensor 6. The camera system control unit 5 issues commands to the lens system control unit 12 via the electrical contacts 11. The lens system control unit 12 appropriately controls a not-illustrated focus lens driving unit and diaphragm driving unit. In a mode for making camera shake corrections, the camera system control unit 5 also controls the camera-side camera shake correction unit 14 based on signals (camera shake detection result) obtained from the camera-side camera shake detection unit 15. Similarly, the lens system control unit 12 controls the lens-side camera shake correction unit 13 based on signals obtained from the lens-side camera shake detection unit 16.

A basic control operation of the camera shake correction units 13 and 14 will be described. The camera system control unit 5 and the lens system control unit 12 initially detect camera shake signals (rotational camera shake and translational camera shake) detected by the camera-side camera shake detection unit 15 and the lens-side camera shake detection unit 16, respectively. Based on the detection results, the camera system control unit 5 and the lens system control unit 12 calculate driving amounts of the image sensor 6 and the camera shake correction lens 3*a* for correcting the camera shake, respectively. Then, the camera system control unit 5 and the lens system control unit 12 output the calculated driving amounts to the camera-side camera shake correction unit 14 and the lens-side camera shake correction unit 13 as command values, respectively. The camera-side camera shake correction unit 14 drives the image sensor 6, and the lens-side camera shake correction unit 13 drives the camera shake correction lens 3*a*, based on the input driving amounts.

In the present exemplary embodiment, in addition to the foregoing control, the camera system control unit 5 and the lens system control unit 12 change the control of the respective camera shake correction units 14 and 13 based on the resolving power of the imaging optical system 3, the resolving power of the image sensor 6, and imaging conditions such as a shutter speed. A detailed control method will be described below.

As described above, the camera system control unit 5 and the lens system control unit 12 control the operation of various parts of the camera main body 1 and the lens apparatus 2 based on user operations made on the not-illustrated operation units of the camera main body 1 and the lens apparatus 2. Still and moving images can thereby be captured.

<About Control of Camera Shake Correction Systems>

Next, a configuration of a camera-side camera shake correction system and a lens-side camera shake correction system according to the present exemplary embodiment will be described with reference to FIGS. 2A and 2B. FIGS. 2A and 2B illustrate control block diagrams of a camera-side camera shake correction system included in the camera main body 1 and a lens-side camera shake correction system included in the lens apparatus 2. FIG. 2A illustrates the control block diagram of the camera-side camera shake correction system. FIG. 2B illustrates the control block diagram of the lens-side camera shake correction system.

As illustrated in FIG. 2A, in the present exemplary embodiment, the camera-side camera shake correction system includes the camera-side camera shake detection unit 15, the camera system control unit 5, the camera-side camera shake correction unit 14, and the image sensor 6. The camera system control unit 5 includes a camera-side target value generation unit 5b that generates a driving target value to be output to the camera-side camera shake correction unit 14 based on the detection result of the camera-side camera shake detection unit 15. The camera system control unit 5 further includes a shutter speed storage unit 5e that stores a set shutter speed. The camera system control unit 5 further includes a lens resolving power storage unit 5f that stores information indicating the resolving power of the imaging optical system 3 (referred to as lens resolving power), and an image sensor resolving power storage unit 5g that stores information indicating the resolving power of the image sensor 6 (referred to as image sensor resolving power). The camera-side target value generation unit 5b generates the driving target value based on the information from the storage units 5e to 5g in addition to the camera shake detection result.

Details of the configuration of the camera-side target value generation unit 5b will be described. The camera-side target value generation unit 5b includes a camera-side filter processing unit 5a that performs filter processing on the output of the camera-side camera shake detection unit 15, a camera-side gain compensator 5c that can change a gain characteristic, and a camera-side phase compensator 5d that can change a phase characteristic. Specifically, the camera-side filter processing unit 5a includes a high-pass filter and a gain compensator based on the characteristics of the camera-side camera shake detection unit 15.

The shutter speed storage unit 5e stores a shutter speed determined from a measurement result obtained by a not-illustrated photometric unit, or a shutter speed input by the user. The lens resolving power storage unit 5f stores data indicating the lens resolving power obtained by the camera system control unit 5 and the lens system control unit 12 communicating with each other when the lens apparatus 2 is attached. If the lens apparatus 2 is replaced, information indicating the lens resolving power is obtained from the new lens apparatus 2 attached, and the data is updated. The data may be updated each time the focal position (focus) of the lens apparatus 2 is changed. If the lens apparatus 2 is a zoom lens, the data may be updated each time the focal length is changed. The image sensor resolving power storage unit 5g stores information about the resolving power of the image sensor 6 included in the camera main body 1. Details of the lens resolving power and the image sensor resolving power will be described below with reference to FIGS. 3A, 3B, and 3C. As illustrated in FIG. 2A, the camera system control unit 5 performs the filter processing and calculates the driving target value based on the information about camera shake input from the camera-side camera shake detection unit 15, and then makes camera shake corrections by driving the image sensor 6 using the camera-side camera shake correction unit 14. Moreover, in the present exemplary embodiment, the camera-side target value generation unit 5b changes at least one of the gain characteristic and the phase characteristic based on the imaging conditions and the resolving power of the imaging system 100, obtained from the shutter speed storage unit 5e, the lens resolving power storage unit 5f, and the image sensor resolving power storage unit 5g. The camera-side target value generation unit 5b thereby changes the responsiveness of the camera shake corrections made by the camera-side camera shake correction unit 14.

As illustrated in FIG. 2B, in the present exemplary embodiment, the lens-side camera shake correction system includes the lens-side camera shake detection unit 16, the lens system control unit 12, the lens-side camera shake correction unit 13, and the camera shake correction lens 3a. The lens system control unit 12 includes a lens-side target value generation unit 12b that generates a driving target value to be output to the lens-side camera shake correction unit 13 based on the detection result of the lens-side camera shake detection unit 16. The lens system control unit 12 further includes a lens resolving power storage unit 12f that stores the information indicating the resolving power of the imaging optical system 3, and an image sensor resolving power storage unit 12g that stores the information indicating the resolving power of the image sensor 6. The lens-side target value generation unit 12b generates the driving target value based on the information from the storage units 12f and 12g and the information indicating the shutter speed obtained from the camera main body 1, in addition to the camera shake detection result.

Details of the configuration of the lens-side target value generation unit 12b will be described. The lens-side target value generation unit 12b includes a lens-side filter processing unit 12a that performs filter processing on the output of the lens-side camera shake detection unit 16, a lens-side gain compensator 12c that can change a gain characteristic, and a lens-side phase compensator 12d that can change a phase characteristic. Specifically, the lens-side filter processing unit 12a includes a high-pass filter and a gain compensator based on the characteristics of the lens-side camera shake detection unit 16.

The image sensor resolving power storage unit 12g stores data indicating the resolving power of the image sensor 6, obtained by the camera system control unit 5 and the lens system control unit 12 communicating with each other when the lens apparatus 2 is attached to the camera main body 1. If the camera main body 1 is replaced, information indicating the resolving power of the image sensor 6 is obtained from the new camera main body 1 to which the lens apparatus 2 is attached, and the data is updated.

The lens resolving power storage unit 12f stores the information indicating the resolving power of the imaging optical system 3. The lens resolving power storage unit 12f may update the data each time the focal position (focus) of the lens apparatus 2 is changed. If the lens apparatus 2 is a zoom lens, the data may be updated each time the focal length is changed. Details of the lens resolving power and the image sensor resolving power will be described below with reference to FIGS. 3A, 3B, and 3C.

As illustrated in FIG. 2B, the lens system control unit 12 also performs filter processing and calculates the driving target value based on the information about camera shake input from the lens-side camera shake detection unit 16, and then makes camera shake corrections by driving the camera shake correction lens 3a using the lens-side camera shake correction unit 13. Moreover, in the present exemplary embodiment, the lens-side target value generation unit 12b changes at least one of the gain characteristic and the phase characteristic based on the imaging conditions and the resolving power of the imaging system 100, obtained from the shutter speed storage unit 5e, the lens resolving power storage unit 12f, and the image sensor resolving power storage unit 12g. The lens-side target value generation unit 12b thereby changes the responsiveness of the camera shake corrections made by the lens-side camera shake correction unit 13.

The effect of changing the responsiveness of camera shake corrections based on the imaging conditions and the resolving power of the imaging system 100 will now be described. A conventional basic control procedure in making a camera shake correction includes performing appropriate filter processing on the output of a camera shake detection unit, generating a target value of a camera shake correction unit using a target value generation unit tuned to specific parameters, and executing driving control.

In other words, the parameters of the phase compensators 5d and 12d and the gain compensators 5c and 12c in FIGS. 2A and 2B have conventionally been fixed.

With the recent sophistication of imaging systems, a lens apparatus 2 including an imaging optical system 3 of improved resolving power and a camera main body 1 including an image sensor 6 of improved resolving power are now emerging. Chances to view a captured image in a screen environment such as on a personal computer (PC) monitor and a smartphone monitor are increasing, and so are the chances of large-size viewing such as a 100% display (100% display means a display of one pixel of a captured image as one pixel of a monitor). Therefore, depending on the resolving power of the imaging systems, small camera shake heretofore unobservable or unnoticeable are now being observed. Moreover, such small camera shake often has a relatively high frequency and tends to be observable in images captured at faster shutter speed (shorter exposure time) than in images captured at slower shutter speed (longer exposure time).

The conventional basic driving control for camera shake correction is performed based on constant parameters regardless of the resolving power of the imaging system or the imaging conditions such as the shutter speed. Therefore, depending on the attached lens apparatus, the camera main body, and the set imaging conditions, it has often been the case that small camera shake is left uncorrected and is observed during the large-size viewing.

In the present exemplary embodiment, if the imaging system 100 (imaging optical system 3 or image sensor 6) has high resolving power, the parameters of the target value generation units 5b and 12b are changed so that the camera shake correction units 14 and 13 have high responsiveness and can handle smaller camera shake (high-frequency camera shake).

The higher the shutter speed, the smaller and the faster in motion the camera shake occurring during exposure. Large camera shake is thus less likely to occur, and small camera shake is more likely to be observed. Therefore, if the shutter speed is high, the parameters of the target value generation units 5b and 12b are changed to increase the responsiveness of the camera shake correction units 14 and 13. It is commonly held that camera shake starts to be noticeable if the shutter speed is slower than 1/f sec or so at a focal length off mm. In other words, the likelihood of camera shake varies both with the focal length and the shutter speed. In the present exemplary embodiment, the responsiveness of the camera shake correction units 14 and 13 is changed based not only on the resolving power of the imaging system 100 (camera main body 1 and lens apparatus 2) but also on the shutter speed. This enables camera shake correction suitable for small camera shake.

As employed herein, to increase responsiveness means to improve responsiveness in a high frequency band. Specifically, depending on the imaging conditions, responsiveness in a band including at least some of frequencies of 10 Hz and higher is improved. For example, if responsiveness in a band including a frequency of f Hz defined by a focal length of f mm is improved, an imaging system having high resolving power can be used to capture an image with improved correction performance against camera shake near f Hz, which is less noticeable in a low resolution system.

The parameters may be set in advance to maintain high responsiveness all the time. However, such an approach raises issues of increased power consumption and noticeable driving noise at a long exposure time because the camera shake correction units 13 and 14 are constantly driven with high responsiveness. Moreover, driving the camera shake correction units 13 and 14 more finely than the resolving power of the imaging system 100 would not make much difference in the resulting captured image. In the present exemplary embodiment, the responsiveness of the camera shake correction units 13 and 14 is changed based on the resolving power of the imaging system 100 and the shutter speed. This enables effective camera shake correction even with an imaging system using a lens and/or an image sensor of high resolving power and regardless of differences in the imaging conditions such as the shutter speed.

The camera system control unit 5 and the lens system control unit 12 may change the responsiveness of the camera shake correction units 14 and 13 based on a shutter mode aside from the foregoing conditions. If the imaging system 100 includes a component that causes an impact inside the imaging system 100, such as the shutter 17 (mechanical shutter) illustrated in FIG. 1B, the impact occurring inside the imaging system 100 other than camera shake (camera movement) can be input to the camera shake detection units 15 and 16. If the responsiveness of the camera shake correction units 13 and 14 is high, the camera shake correction units 13 and 14 can be driven in response to the impact. The foregoing change in the responsiveness is therefore implemented in an electronic shutter mode where the mechanism of the shutter 17 is not driven or an electronic front curtain shutter mode where vibrations from the driving of the shutter 17 are not input to the camera shake detection unit 15 or 16 during exposure of the image sensor 6.

Alternatively, the responsiveness of the camera shake correction units 13 and 14 may be changed during the exposure period of the image sensor 6. With the responsiveness increased, the camera shake correction units 13 and 14 typically respond positively to external disturbance as well. In other words, the camera shake correction units 13 and 14 are driven with high responsiveness even to external disturbance input to the camera shake detection units 15 and 16. Thus, if an impact not intended by the user is input to the imaging system 100 during framing or in an imaging preparation operation where the image sensor 6 is not exposed, the camera shake correction units 13 and 14 can be driven in response to the impact. If the driving amounts of the camera shake correction units 13 and 14 before exposure are large, strokes for camera shake correction during exposure can be insufficient. Therefore, in the present exemplary embodiment, the parameters (hereinafter, may be referred to as driving control parameters) of the camera shake correction units 13 and 14 are changed during the exposure of the image sensor 6. As described above, the increased responsiveness of the camera shake correction units 13 and 14 can increase the power consumption. Therefore, the responsiveness is changed during the exposure of the image sensor 6 from the viewpoint of the power consumption as well. As employed herein, during exposure refers to a period where exposure for capturing a recording image (a still image or one frame of a moving image) is performed and not a period where exposure for capturing a live view image is performed, unless otherwise specified.

<About Resolving Power>

Figure 3A:
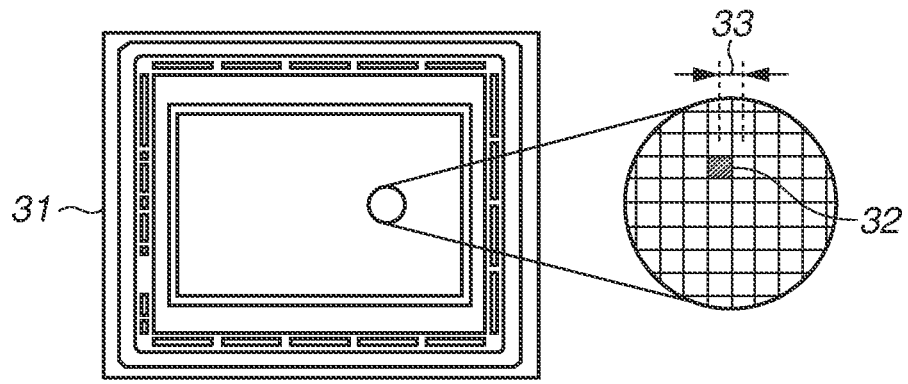
FIG. 3A is a diagram for describing resolving power of the imaging system.
Figure 3B:
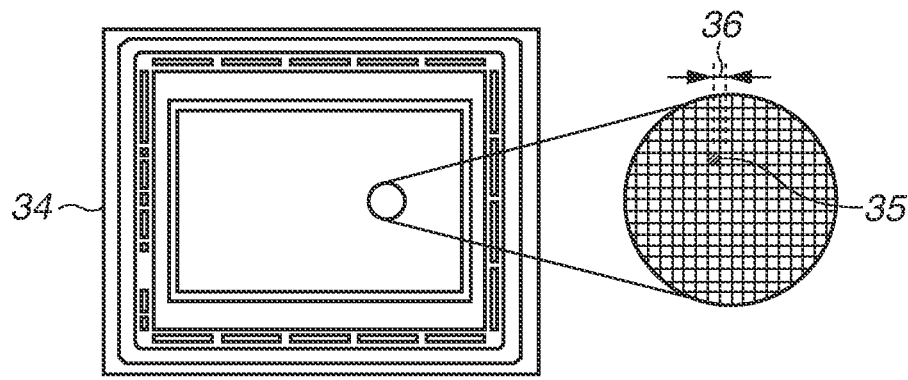
FIG. 3B is a diagram for describing the resolving power of the imaging system.
Figure 3C:
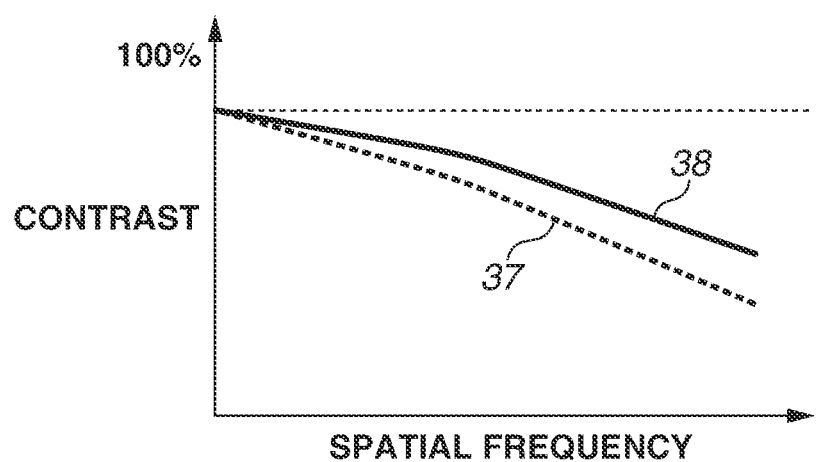
FIG. 3C is a diagram for describing the resolving power of the imaging system.

Next, the resolving power to be referred to in changing the responsiveness of the camera shake correction units 13 and 14 according to the present exemplary embodiment will be described with reference to FIGS. 3A, 3B, and 3C. FIGS. 3A, 3B, and 3C are diagrams for describing the resolving power of the image sensor 6 and the imaging optical system 3. FIG. 3A illustrates an image sensor having certain resolving power. FIG. 3B illustrates an image sensor having higher resolving power than that in FIG. 3A. FIG. 3C is a graph for describing two imaging optical systems having different resolving power.

FIG. 3A illustrates an image sensor 31 and an enlarged view thereof. The image sensor 31 includes a plurality of pixels 32. The pixels 32 are arranged at a pitch 33. FIG. 3B illustrates an image sensor 34 having higher resolving power than that of the image sensor 31 illustrated in FIG. 3A and an enlarged view thereof. The image sensor 34 includes a plurality of pixels 35. The pixels 35 are arranged at a pitch 36. As illustrated in FIGS. 3A and 3B, the image sensor 34 has the pixel pitch 36 smaller than the pixel pitch 33 of the image sensor 31, and can thus capture an image of finer objects. In other words, the resolving power of the image sensor 34 with the relatively smaller pixel pitch is higher than that of the image sensor 31. Thus, small camera shake is more noticeable with the image sensor 34 than with the image sensor 31.

The lens apparatus 2 according to the present exemplary embodiment, when attached to a camera main body including the image sensor 34 illustrated in FIG. 3B, changes the driving control parameters so that the lens-side camera shake correction unit 13 has higher responsiveness than when the lens apparatus 2 is attached to a camera main body including the image sensor 31 illustrated in FIG. 3A.

FIG. 3C illustrates modulation transfer function (MTF) curves of two imaging optical systems. An MTF curve is a graph with a spatial frequency on the horizontal axis and contrast on the vertical axis, and known as a graph for representing the resolving power of an imaging optical system. The MTF curve expresses how faithfully to an object having a spatial frequency the imaging optical system can transfer a signal. In general, the higher the contrast at each spatial frequency, the higher the resolving power. An MTF curve 37 is an MTF curve of a lens apparatus. An MTF curve 38 is an MTF curve of a lens apparatus having higher resolving power than that of the lens apparatus of the MTF curve 37. As illustrated in FIG. 3C, the imaging optical system having the MTF represented by the MTF curve 38 (hereinafter, may be referred to as a first imaging optical system) has higher contrast at each spatial frequency than that of the imaging optical system having the MTF represented by the MTF curve 37 (hereinafter, may be referred to as a second imaging optical system). In other words, the imaging optical system having the MTF represented by the MTF curve 38 can fully express objects (capture an image of finer objects) at each spatial frequency. More specifically, the first imaging optical system having the MTF represented by the MTF curve 38 has higher resolving power and makes small camera shake more noticeable than the second imaging optical system having the MTF represented by the MTF curve 37.

Therefore, when a lens apparatus 2 including the first imaging optical system is attached, the camera main body 1 according to the present exemplary embodiment changes the driving control parameters so that the camera-side camera shake correction unit 14 has higher responsiveness than when a lens apparatus 2 including the second imaging optical system is attached. The resolving power of an imaging optical system may be determined based not on the MTF curve itself but on the number of lines resolvable per 1 mm (lines/mm) in an image space. Specific examples of the change of the driving control parameters will be described with reference to FIGS. 4A and 4B.

<About Change of Driving Control Parameters>

Figure 4A:
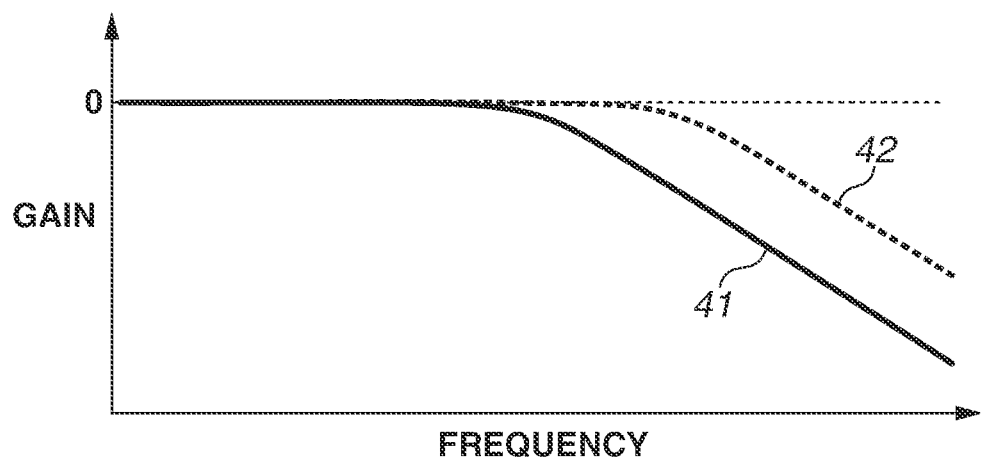
FIG. 4A is a diagram for describing a change in responsiveness of the camera shake correction units according to the first exemplary embodiment.
Figure 4B:
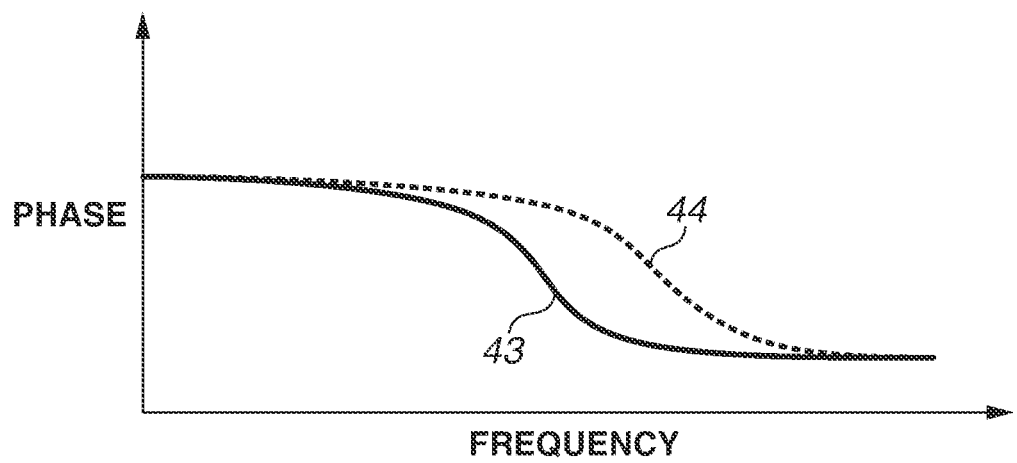
FIG. 4B is a diagram for describing a change in the responsiveness of the camera shake correction units according to the first exemplary embodiment.

Next, a change made in responsiveness by changing the driving control parameters of the camera shake correction units 13 and 14 will be described with reference to FIGS. 4A and 4B. FIGS. 4A and 4B are diagrams for describing the change in the responsiveness of the lens- and camera-side camera shake correction units 13 and 14 according to the present exemplary embodiment, or graphs illustrating the frequency characteristics (frequency response characteristics) of the camera shake correction units 13 and 14. FIG. 4A is a graph illustrating the gain of the frequency response. FIG. 4B is a graph illustrating the phase of the frequency response.

In FIG. 4A, a curve 41 and a curve 42 represent examples of the frequency characteristic of a control gain (hereinafter, referred to simply as gain) of the camera shake correction units 13 and 14. The vertical axis indicates the gain. A gain of 0 indicates that the lens- and camera-side camera shake correction units 13 and 14 can be actually driven as much as the input driving amount. Values less than 0 (lower in the diagram) indicate that there is a difference between the driving amount input from the control unit and the actual driving amount. The horizontal axis indicates the frequency. Gains at higher frequencies are illustrated to the right. To increase the responsiveness of a camera shake correction unit or units (camera-side camera shake correction unit 14 or lens-side camera shake correction unit 13, or both), the gain characteristic is changed from the curve 41 to the curve 42. Specifically, to increase the responsiveness of the camera-side camera shake correction unit 14, the value of the camera-side gain compensator 5c illustrated in FIG. 2A is increased. To increase the responsiveness of the lens-side camera shake correction unit 13, the value of the lens-side gain compensator 12c illustrated in FIG. 2B is increased. As a result, the gain of the frequency response of the camera shake correction unit changes from the curve 41 to the curve 42, whereby the gain in the high frequency band is boosted and the camera shake correction unit can respond at higher frequencies as well. The method for changing the gain is not limited in particular. For example, the gain characteristic may be switched from the curve 41 to the curve 42 if the resolving power of the imaging system 100 based on that of the image sensor 6 and that of the imaging optical system 3 is higher than or equal to a predetermined value. The gain may be changed based on the resolving power of the imaging system 100 so that the gain characteristic shifts from the curve 41 to the curve 42 as the resolving power increases. The gain may be set so that the gain characteristic is set to the curve 41 if the resolving power of the imaging system 100 is lower than a predetermined value, the gain characteristic approaches the curve 42 with the increasing resolving power if the resolving power is higher than or equal to the predetermined value, and the gain characteristic remains constant at the curve 42 once the resolving power reaches another predetermined value. The same applies to the case of changing the responsiveness based on the shutter speed. The gain characteristic may be switched depending on whether the shutter speed is faster than a predetermined value. The gain may be set so that the gain characteristic shifts from the curve 41 to the curve 42 as the shutter speed increases.

In FIG. 4B, a curve 43 and a curve 44 represent examples of the frequency response of the phase of the camera shake correction units 13 and 14. The vertical axis indicates the phase. The higher in the chart, the smaller a phase delay between the input of the driving amount from the control unit and the completion of the actual driving. The lower in the chart, the greater the phase delay. The horizontal axis indicates the frequency. Phases at higher frequencies are illustrated to the right. To increase the responsiveness of a camera shake correction unit or units (camera-side camera shake correction unit 14 or lens-side camera shake correction unit 13, or both), the phase characteristic is changed from the curve 43 to the curve 44. Specifically, to increase the responsiveness of the camera-side camera shake correction unit 14, the value of the camera-side phase compensator 5d illustrated in FIG. 2A is changed to shift the phase delay to higher frequencies. To increase the responsiveness of the lens-side camera shake correction unit 13, the value of the lens-side phase compensator 12d is changed to shift the phase delay to higher frequencies. As a result, the phase of the frequency response of the camera shake correction unit changes from the curve 43 to the curve 44, whereby the phase delay is shifted to higher frequencies and the responsiveness of the camera shake correction unit improves even at higher frequencies. As with the gain, the phase may be changed by switching the phase characteristic from the curve 43 to the curve 44 if the resolving power of the imaging system 100 is higher than or equal to a predetermined value. The phase may be gradually changed based on the resolving power. The same applies to the case of changing the responsiveness based on the shutter speed. The phase characteristic may be switched depending on whether the shutter speed is faster than a predetermined value. The phase may be set so that the phase characteristic shifts from the curve 41 to the curve 42 as the shutter speed increases. The responsiveness may be changed by changing both the phase and the gain.

As described above, in the present exemplary embodiment, the responsiveness at higher frequencies is improved by changing the driving control parameters of the camera shake correction units 13 and 14 based on the resolving power of the imaging system 100 and imaging conditions such as the shutter speed.

In the present exemplary embodiment, the responsiveness is described to be improved by changing the parameters of the gain compensators 5c and 12c and the phase compensators 5d and 12d. However, the method for changing the driving control parameters of the camera shake correction units 13 and 14 is not limited thereto. For example, proportional-integral-differential (PID) control parameters may be changed.

<Description of Procedure>

Next, an antivibration control procedure for the camera main body 1 according to the present exemplary embodiment will be described with reference to FIG. 5. The procedure illustrated in FIG. 5 is started upon power-on of the camera main body 1, and performed by the camera system control unit 5 obtaining various types of information from the components in the camera main body 1 and from the lens system control unit 12 and controlling the components. The procedure may be started in response to switching from a playback mode where captured images are displayed to an imaging mode for imaging standby.

In step S5001, the camera system control unit 5 checks the resolving power of the image sensor 6 in the camera main body 1. The processing proceeds to step S5002. The resolving power of the image sensor 6 can be checked by reading information about the pixel pitch stored in the memory unit 8 as information indicating the resolving power. Alternatively, a model number of the camera main body 1 may be linked with the image sensor resolving power, and the model number of the camera main body 1 may be checked as the information indicating the image sensor resolving power.

In step S5002, the camera system control unit 5 communicates with the lens system control unit 12 via the electrical contacts 11, and checks the resolving power of the imaging optical system 3 (lens resolving power) of the lens apparatus 2. The processing proceeds to step S5003. The resolving power of the imaging optical system 3 can be checked by reading the MTF curve of the imaging optical system 3, stored in the lens system control unit 12, through communication. If the lens apparatus 2 is a zoom lens, the resolving power varies with the focal length. In such a case, the camera system control unit 5 may obtain information about MTF curves corresponding to a plurality of focal lengths in step S5002, and identify the MTF curve corresponding to the current focal length in a focal length check step to be described below. The memory unit 8 may store a table linking model numbers of lens apparatuses 2 with information indicating lens resolving power. The camera system control unit 5 may refer to the table to obtain the information indicating the lens resolving power based on the model number (identifier (ID)) of the lens apparatus 2 received from the lens apparatus 2.

In step S5003, the camera system control unit 5 determines whether an imaging preparation start instruction (half-pressing of the shutter release button) S1 is input by the user. If the imaging preparation start instruction S1 is determined to be input (YES in step S5003), the processing proceeds to step S5004. If not (NO in step S5003), the processing returns to step S5003 for standby.

In step S5004, the camera system control unit 5 checks the focal length of the imaging optical system 3. The processing proceeds to step S5005. Here, focal length information about the imaging optical system 3 may be obtained by the camera system control unit 5 communicating with the lens system control unit 12 and obtaining the focal length information about the imaging optical system 3 upon power-on of the camera main body 1. Alternatively, if the lens apparatus 2 is a zoom lens, the camera system control unit 5 may communicate with the lens system control unit 12 and obtain focal length information each time the focal length is changed. The obtained focal length information is stored in the memory unit 8, and the camera system control unit 5 checks the focal length by referring to the focal length information in this step. In step S5004, the camera system control unit 5 may check the focal length by communicating with the lens system control unit 12 again and obtaining the focal length information.

In step S5005, the camera system control unit 5 checks the shutter speed. The processing proceeds to step S5006. Here, the shutter speed may be checked by reading the shutter speed set by the user, or by reading the shutter speed determined by a not-illustrated AE unit.

In step S5006, the camera system control unit 5 determines whether an imaging start instruction (pressing of the shutter release button) S2 is input by the user. If the imaging start instruction S2 is determined to be input (YES in step S5006), the processing proceeds to step S5007. If not (NO in step S5006), the processing returns to step S5003.

In step S5007, the camera system control unit 5 determines whether the shutter mode is either an electronic shutter mode or an electronic front curtain shutter mode. If the shutter mode is either the electronic shutter mode or the electronic front curtain shutter mode (YES in step S5007), the processing proceeds to step S5008. If not (NO in step S5007), the processing proceeds to step S5009.

In step S5008, the camera system control unit 5 sets the responsiveness of the camera-side camera shake correction unit 14 based on the resolving power of the imaging system 100 and the shutter speed. The resolving power of the imaging system 100 can be obtained based on the resolving power of the image sensor 6 checked in step S5001, the resolving power of the imaging optical system 3 checked in step S5002, and the focal length checked in step S5004. For example, the camera system control unit 5 may compare the resolving power of the imaging optical system 3 obtained based on the current focal length of the imaging optical system 3 with the resolving power of the image sensor 6, and employ the lower as the resolving power of the imaging system 100. If the resolving power of the imaging system 100 is lower than or equal to a predetermined value and the shutter speed is lower than or equal to a predetermined value (i.e., the same as or slower than the predetermined value), the camera system control unit 5 maintains the normal driving control parameter (referred to as a first parameter). If the resolving power of the imaging system 100 is higher than the predetermined value or if the shutter speed is higher than the predetermined value, the camera system control unit 5 sets a driving control parameter (second parameter) so that the camera-side camera shake correction unit 14 has higher responsiveness than that when the first parameter is set as described with reference to FIGS. 4A and 4B. After the setting, the processing proceeds to step S5009. While the first parameter here is described to be set in advance, the camera system control unit 5 may set the first parameter if the resolving power of the imaging system 100 is lower than or equal to the predetermined value and the shutter speed is lower than or equal to the predetermined value, and set the second parameter if not.

In step S5009, the camera system control unit 5 starts to drive the camera-side camera shake correction unit 14. The processing proceeds to step S5010. In the present exemplary embodiment, the camera-side camera shake correction unit 14 corrects camera shake by moving the image sensor 6 based on the detection result of the camera-side camera shake detection unit 15. In the present exemplary embodiment, the lens apparatus 2 includes the lens-side camera shake correction unit 13. Thus, the detected camera shake is corrected by the camera-side camera shake correction unit 14 and the lens-side camera shake correction unit 13 in a shared manner. The mode of sharing is not limited in particular. For example, the camera-side camera shake correction unit 14 and the lens-side camera shake correction unit 13 may make camera shake corrections to correct respective proportions of the detected amount of camera shake based on a sharing ratio determined before this step. For example, if the sharing ratio is 1:1, the camera system control unit 5 controls the camera-side camera shake correction unit 14 to correct camera shake as much as an amount determined by multiplying the detection result of the camera-side camera shake detection unit 15 by 0.5.

In step S5010, the camera system control unit 5 starts to expose the image sensor 6 to capture an image for a time equivalent to the shutter speed read in step S5005. The processing proceeds to step S5011. In step S5011, the camera system control unit 5 stops driving the camera-side camera shake correction unit 14. The processing proceeds to step S5012.

In step S5012, the camera system control unit 5 determines whether to end the imaging mode based on the user's input. If the imaging mode is determined to be ended (YES in step S5012), the processing ends. If not (NO in step S5012), the processing returns to step S5003.

While, in FIG. 5, the camera system control unit 5 is described to control the camera main body 1 along the foregoing antivibration control flowchart, the lens system control unit 12 may control the camera main body 1 along the antivibration control flowchart instead.

FIG. 6 is an antivibration control flowchart for the lens apparatus 2 according to the present exemplary embodiment. The procedure illustrated in FIG. 6 is started upon power-on of the camera main body 1, and performed by the lens system control unit 12 obtaining various types of information from the components in the lens apparatus 2 and from the camera system control unit 5 and controlling the components. The procedure may be started in response to switching of the camera main body 1 from the playback mode where captured images are displayed to the imaging mode for imaging standby.

In step S6001, the lens system control unit 12 communicates with the camera system control unit 5 via the electrical contacts 11, and checks the resolving power of the image sensor 6 in the camera main body 1. The processing proceeds to step S6002. The resolving power of the image sensor 6 can be checked by obtaining information about the pixel pitch from the camera system control unit 5 as information indicating the resolving power. A table linking model numbers of camera main bodies 1 with image sensor resolving power may be stored in a memory unit (not illustrated) in the lens apparatus 2, and the lens system control unit 12 may check the image sensor resolving power based on the model number (ID) of the camera main body 1 received from the camera main body 1.

In step S6002, the lens system control unit 12 checks the resolving power of the imaging optical system 3. The processing proceeds to step S6003. The resolving power of the imaging optical system 3 can be checked by reading information about the MTF curve of the imaging optical system 3, stored in a not-illustrated memory unit.

In step S6003, the lens system control unit 12 determines whether a notification that the imaging preparation start instruction (half-pressing of the shutter release button) S1 is input by the user is received from the camera system control unit 5. If the input of the imaging preparation start instruction S1 is notified (YES in step S6003), the processing proceeds to step S6004. If not (NO in step S6003), the processing returns to step S6003 for standby.

In step S6004, the lens system control unit 12 checks the focal length of the imaging optical system 3. The processing proceeds to step S6005.

In step S6005, the lens system control unit 12 checks the shutter speed. The processing proceeds to step S6006. The lens system control unit 12 receives the information about the shutter speed by communicating with the camera system control unit 5. The shutter speed to be checked here does not need to be the shutter speed itself and may be any information indicating the shutter speed. For example, suppose that the responsiveness is increased if the shutter speed is lower than or equal to a predetermined value as described with reference to the flowchart of FIG. 5. In such a case, the lens system control unit 12 may obtain information about whether the shutter speed is higher (i.e., faster) than the predetermined value.

In step S6006, the lens system control unit 12 receives information indicating whether the shutter mode is either the electronic shutter mode or the electronic front curtain shutter mode from the camera system control unit 5. If the shutter mode is the electronic shutter mode or the electronic front curtain shutter mode (YES in step S6006), the processing proceeds to step S6007. If not (NO in step S6006), the processing proceeds to step S6008.

In step S6007, the lens system control unit 12 sets the responsiveness of the lens-side camera shake correction unit 13 based on the resolving power of the imaging system 100 and the shutter speed. The method for setting the responsiveness is similar to that in step S5008. A description thereof will thus be omitted.

In step S6008, the lens system control unit 12 starts to drive the lens-side camera shake correction unit 13. The processing proceeds to step S6009. In the present exemplary embodiment, the lens-side camera shake correction unit 13 corrects camera shake by moving the camera shake correction lens 3a based on the detection result of the lens-side camera shake detection unit 16. In the present exemplary embodiment, the camera-side camera shake correction unit 14 starts camera shake corrections after the input of the imaging start instruction S2. The camera-side camera shake correction unit 14 therefore does not correct camera shake during the execution of this step. Here, the lens-side camera shake correction unit 13 therefore singly make camera shake corrections instead of shared camera shake corrections by the camera- and lens-side camera shake correction units 14 and 13 described in the foregoing step S5009.

In step S6009, the lens system control unit 12 determines whether a notification that the imaging start instruction S2 is input by the user is received from the camera system control unit 5. If the input of the imaging start instruction S2 is notified (YES in step S6009), the processing proceeds to step S6010. If not (NO in step S6009), the processing returns to step S6003.

In step S6010, the lens system control unit 12 continues correcting camera shake by switching the driving method of the lens-side camera shake correction unit 13 from the method for singly correcting camera shake by the lens-side camera shake correction unit 13 to that for correcting camera shake in cooperation with the camera-side camera shake correction unit 14. Here, the camera- and lens-side camera shake correction units 14 and 13 make camera shake corrections in a shared manner as described in the foregoing step S5009.

In step S6011, the lens system control unit 12 determines whether the imaging by the camera main body 1 is ended. The determination may be made based on whether the end of imaging is notified from the camera main body 1, or based on whether a time as much as the shutter speed checked in step S6005 has elapsed since the imaging start timing. If the imaging is ended (YES in step S6011), the processing proceeds to step S6012. If not (NO in step S6011), the processing returns to step S6011 for standby.

In step S6012, the lens system control unit 12 determines whether a notification to end the imaging mode is received from the camera system control unit 5. If the notification to end the imaging mode is received (YES in step S6012), the processing ends. If not (NO in step S6012), the processing returns to step S6003.

In FIGS. 5 and 6, both the camera main body 1 and the lens apparatus 2 are described to include the respective camera shake correction units and set the responsiveness of the camera shake correction units based on the resolving power of the imaging system 100 and the shutter speed. However, the present exemplary embodiment is not limited thereto. The responsiveness of one of the camera- and lens-side camera shake correction units 14 and 13 may be changed. For example, if the imaging system 100 is a combination of the camera main body 1 including the camera-side camera shake correction unit 14 and a lens apparatus not including the lens-side camera shake correction unit 13, the driving control parameter of the camera-side camera shake correction unit 14 is changed based on the resolving power of the image sensor 6, the resolving power and focal length of the imaging optical system, and the shutter speed. If the imaging system 100 is a combination of a camera main body not including the camera-side camera shake correction unit 14 and the lens apparatus 2 including the lens-side camera shake correction unit 13, the driving control parameter of the lens-side camera shake correction unit 13 is changed based on the resolving power of the image sensor, the resolving power and focal length of the imaging optical system 3, and the shutter speed. Even if the camera main body 1 and the lens apparatus 2 both include the respective camera shake correction units, the responsiveness of one of the two camera shake correction units may be changed. For example, similar effects can be obtained from a configuration where the phase compensator 5d and the gain compensator 5c included in the camera-side target value generation unit 5b have fixed characteristics and the responsiveness of the lens-side camera shake correction system of the lens apparatus 2 is changed based on the resolving power of the imaging system 100.

In FIG. 5, the camera system control unit 5 is described to check the resolving power of the image sensor 6 in step S5001, check the resolving power of the imaging optical system 3 in step S5002, and obtain the resolving power of the imaging system 100 in step S5008. However, the method for obtaining the resolving power of the imaging system 100 is not limited thereto. For example, the resolving power of the imaging system 100 may be obtained by determining whether the resolving power of the imaging optical system 3 is higher than or equal to a predetermined value upon checking the resolving power of the imaging optical system 3. The predetermined value is the value set in advance based on the resolving power of the image sensor 6. If the resolving power of the imaging optical system 3 is lower than the predetermined value, first responsiveness based on the resolving power of the image sensor 6 may be set as the responsiveness of the camera-side camera shake correction unit 14. If the resolving power of the imaging optical system 3 is higher than or equal to the predetermined value, second responsiveness based on the resolving power of the imaging optical system 3 may be set as the responsiveness of the camera-side camera shake correction unit 14. The first responsiveness may be set as default responsiveness of the camera-side camera shake correction unit 14, and the responsiveness of the camera-side camera shake correction unit 14 may be switched to the second responsiveness higher than the first responsiveness if the resolving power of the imaging optical system 3 is higher than or equal to the predetermined value. Even in such a case, the second responsiveness may be increased as the resolving power of the imaging optical system 3 increases. Constant responsiveness higher than the first responsiveness may be set if the resolving power of the imaging optical system 3 is higher than or equal to the predetermined value.

In FIG. 6, the lens-side camera shake correction unit 13 is driven (singly) in step S6008 after the responsiveness of the lens-side camera shake correction unit 13 is set in step S6007. However, the order of processing is not limited in particular as long as the responsiveness of the lens-side camera shake correction unit 13 has been changed to the second parameter by the time of exposure with a predetermined condition satisfied.

As described above, accurate camera shake corrections can be made in an imaging system using a lens and/or image sensor of high resolving power by switching the characteristics of the camera shake correction units based on the resolving power of the image sensor and the imaging optical system. Moreover, switching the characteristics of the camera shake correction units based on the shutter speed enables accurate camera shake corrections regardless of differences in the imaging conditions.

An imaging system according to a second exemplary embodiment of the disclosure will be described below with reference to FIGS. 7A to 8B. The present exemplary embodiment deals with an imaging system where, if shutter speed is higher than or equal to a predetermined value, the responsiveness of camera shake correction in the entire imaging system is increased by changing the manner of sharing the camera shake correction between a lens-side camera shake correction unit 13 and a camera-side camera shake correction unit 14. Specifically, if the shutter speed is higher than or equal to the predetermined value, the lens- and camera-side camera shake correction systems are controlled so that one of the systems higher in the responsiveness of camera shake correction takes charge of corrections in a high frequency band of a camera shake signal, and the other thereof takes charge of corrections in a low frequency band. On the other hand, if the shutter speed is lower than the predetermined value (slower than the predetermined value), the lens- and camera-side camera shake correction systems both correct camera shake as much as a sharing ratio using the respective camera shake signals detected. A basic configuration of the imaging system is similar to that of the first exemplary embodiment described with reference to FIGS. 1A, 1B, 2A, and 2B. Only differences will therefore be described in detail.

A configuration of the camera-side camera shake correction system and the lens-side camera shake correction system according to the present exemplary embodiment will be described with reference to FIGS. 7A and 7B.

FIGS. 7A and 7B are control block diagrams of the camera-side camera shake correction system included in the camera main body 1 and the lens-side camera shake correction system included in the lens apparatus 2. FIG. 7A is a control block diagram of the camera-side camera shake correction system. FIG. 7B is a control block diagram of the lens-side camera shake correction system. Since the basic configuration is similar to that of the first exemplary embodiment described with reference to FIGS. 2A and 2B, only differences will be described in detail.

In FIG. 7A, the camera system control unit 5 includes a responsiveness determination unit 61 for changing control based on the responsiveness of both the camera-side camera shake correction system and the lens-side camera shake correction system. The responsiveness determination unit 61 compares the responsiveness of the camera-side camera shake correction system with that of the lens-side camera shake correction system based on information about both of the camera shake correction systems, and determines which camera shake correction system has higher responsiveness (more favorable responsiveness in a high frequency band). Examples of the information for the responsiveness determination unit 61 to refer to here include the weights of movable parts of the camera- and lens-side camera shake correction units 14 and 13, frequency response (motor driving characteristics) of the same, and sensitivity characteristics of the camera- and lens-side camera shake detection units 15 and 16. The camera shake correction system having higher responsiveness at high frequencies can be determined by selecting a system where the weight of the movable part is lighter, or selecting a system having frequency response (motor driving characteristics) capable of tracking at higher frequencies. The camera shake correction system having higher responsiveness at high frequencies can be determined by selecting a system where the sensitivity characteristics of the camera shake detection units at high frequencies is higher. Specifically, the camera shake correction system having higher responsiveness at high frequencies can be determined by selecting a system where the detection sensitivity of camera shake at high frequencies is higher, or the cutoff frequencies of low-pass filters used in the internal signal processing of the camera shake detection units is higher (higher frequency signals are output). Alternatively, a table linking information indicating responsiveness with model numbers of lens apparatuses may be stored in the memory unit 8 in advance. In such a case, the responsiveness determination unit 61 may obtain the responsiveness of the lens-side camera shake correction system based on the received model number of the lens apparatus 2, and compare the camera shake correction systems in responsiveness based on the obtained responsiveness. Since the responsiveness of the camera-side camera shake correction system is known in advance, the responsiveness determination unit 61 may store comparison results for the respective model numbers of lens apparatuses in the memory unit 8. For example, information indicating that the responsiveness of the camera-side camera shake correction system is lower than that of the lens-side camera shake correction system of a lens apparatus with model number x and higher than that of the lens-side camera shake correction system of a lens apparatus with model number y may be stored. Alternatively, the lens apparatus 2 may store an evaluation value indicating the responsiveness of the lens-side camera shake correction system and transmit the evaluation value to the camera system control unit 5, and the responsiveness determination unit 61 may determine the responsiveness accordingly.

The camera system control unit 5 according to the present exemplary embodiment changes correction control on the camera- and lens-side camera shake correction systems based on the shutter speed stored in the shutter speed storage unit 5e and the responsiveness of the camera shake correction systems determined by the responsiveness determination unit 61. Specifically, the responsiveness determination unit 61 determines which has higher responsiveness at high frequencies, the camera-side camera shake correction system or the lens-side camera shake correction system, and determines the method of sharing frequencies for the camera shake correction systems to make corrections at based on the shutter speed. As illustrated in FIG. 7B, the lens system control unit 12 receives the determination result of the responsiveness determination unit 61 and the shutter speed stored in the shutter speed storage unit 5e from the camera system control unit 5. The lens system control unit 12 then determines the method of sharing the frequencies for the camera shake correction systems to make corrections at based on the shutter speed.

The sharing method will be described. In correcting camera shake using both the camera-side camera shake correction system and the lens-side camera shake correction system, the camera shake correction systems operate based on the output of the respective camera shake detection units (camera-side camera shake detection unit 15 and lens-side camera shake detection unit 16). In such a case, camera shake can be overcorrected if the camera shake correction units make corrections as much as all the camera shake amounts detected by the respective camera shake detection units.

In the present exemplary embodiment, as described above, if the shutter speed is lower than a predetermined value, the lens- and camera-side camera shake correction systems then each correct camera shake as much as an amount based on the sharing ratio using the respective camera shake signals detected. Such a sharing method will be referred to as a first method. The first method can prevent overcorrection of camera shake, for example, by the camera shake correction units making corrections half as much as the camera shake amounts detected by the respective camera shake detection units.

Since the first method can be implemented by multiplying the camera shake amounts detected by the respective camera shake detection units or the driving amounts of the respective camera shake correction units by specific ratios (making gain compensation), the controllers can be relatively easily configured. Moreover, the sharing ratio can be determined based on the correction strokes (movable amounts) of the respective camera shake correction units. This can reduce the occurrence of situations where camera shake is unable to be corrected despite the presence of room for a stroke for one of the camera shake correction units because the other has reached an end of a movable range (stroke-out), regardless of the frequency of the input camera shake.

On the other hand, if the shutter speed is higher than or equal to the predetermined value, the lens- and camera-side camera shake correction systems are controlled so that one having higher responsiveness takes charge of corrections in a high frequency band of the detected camera shake signal and the other takes charge of corrections in a low frequency band. Such a sharing method will be referred to as a second method. The method can reduce camera shake left uncorrected at high frequencies that is visually noticeable at high shutter speed, by making the camera shake correction system having higher responsiveness make corrections in a high frequency band of the detected camera shake signal.

The following description will be given on the assumption that the lens-side camera shake correction system is determined to have higher responsiveness by the responsiveness determination unit 61. The first method and the second method are different in the processing of the camera-side filter processing unit 5a and the processing of the lens-side filter processing unit 12a.

The processing of the camera-side filter processing unit 5a and the processing of the lens-side filter processing unit 12a according to the first method will be described. As illustrated in FIG. 7A, the camera system control unit 5 reduces noise by performing high-pass filter processing based on the characteristic of the camera-side camera shake detection unit 15 on the detection signal (camera shake signal) obtained from the camera-side camera shake detection unit 15 using a camera shake signal filter processing unit 74. In the first method, a gain compensator 73 then multiplies the filter-processed detection signal by a gain through the dotted-lined route. The configuration of the camera shake signal filter processing unit 74 and the gain compensator 73 is similar to that of the camera-side filter processing unit 5a according to the first exemplary embodiment. The output of the gain compensator 73 is input to the phase compensator 5d, changed in the phase and gain characteristics as in the first exemplary embodiment, and input to the camera-side camera shake correction unit 14.

The lens-side filter processing unit 12a performs similar processing. As illustrated in FIG. 7B, the lens system control unit 12 performs high-pass filter processing based on the characteristic of the lens-side camera shake detection unit 16 on the detection signal (camera shake signal) from the lens-side camera shake detection unit 16 using a camera shake signal filter processing unit 76. In the first method, a gain compensator 75 then multiplies the filter-processed detection signal by a gain through the dotted-lined route. The configuration of the camera shake signal filter processing unit 76 and the gain compensator 75 is similar to that of the camera-side filter processing unit 5a according to the first exemplary embodiment. The output of the gain compensator 75 is input to the phase compensator 12d, changed in the phase and gain characteristics as in the first exemplary embodiment, and input to the lens-side camera shake correction unit 13. In the first method, the gain compensators 5c and 12 thus multiply the detected camera shake signals by the sharing ratio, whereby the camera shake correction systems correct camera shake based on the sharing ratio.

By contrast, in the second method, the camera- and lens-side filter processing units 5a and 12a perform filter processing so that the lens-side camera shake correction system determined to have higher responsiveness by the responsiveness determination unit 61 makes corrections in the high frequency band and the other, camera-side camera shake correction system, makes corrections in the low frequency band.

The specific processing of the camera-side filter processing unit 5a and that of the lens-side filter processing unit 12a will be described.

In the second method, the camera shake signal filter-processed by the camera shake signal filter processing unit 74 of FIG. 7A is passed through the solid-lined route. The solid-lined route includes a high-pass filter (HPF) 71 and a gain compensator 72.

Similarly, as illustrated in FIG. 7B, in the second method, the camera shake signal filter-processed by the camera shake signal filter processing unit 76 is passed through the solid-lined route. The solid-lined route includes an HPF 71 and a gain compensator 72.

If two camera shake correction systems are used to share the frequencies to make corrections in, one of the camera shake correction system may include a built-in HPF having a certain cutoff frequency while the other subtracts the output of the built-in HPF having the same cutoff frequency from the camera shake signal.

On the solid-lined route illustrated in FIG. 7B, the lens-side filter processing unit 12a of the lens-side camera shake correction system includes the HPF 71 and the gain compensator 72 for the camera shake signal input from the lens-side camera shake detection unit 16. On the solid-lined route illustrated in FIG. 7A, the camera-side filter processing unit 5a is configured to subtract the camera shake signal passed through the HPF 71 and the gain compensator 72 from the camera shake signal input from the camera-side camera shake detection unit 15. With such a configuration, one of the camera shake correction systems performs signal processing through the HPF, and the other performs signal processing for subtracting the output of the HPF from the input camera shake signal (hereinafter, may be referred to as "(1−HPF)" or "through (1−HPF)"). The two camera shake correction systems can thus control the sharing of the frequencies. While, in the present exemplary embodiment, the camera shake correction systems are described to include an HPF and (1−HPF), the camera shake correction systems may be configured using low-pass filters (LPFs). As with the HPFs, one of the camera shake correction systems performs signal processing through the LPF, and the other performs signal processing through (1−LPF). The two camera shake correction systems can thus control the sharing of the frequencies.

Next, the frequency characteristics of both the camera- and lens-side camera shake correction systems according to the present exemplary embodiment will be described with reference to FIGS. 8A and 8B.

Figure 8A:
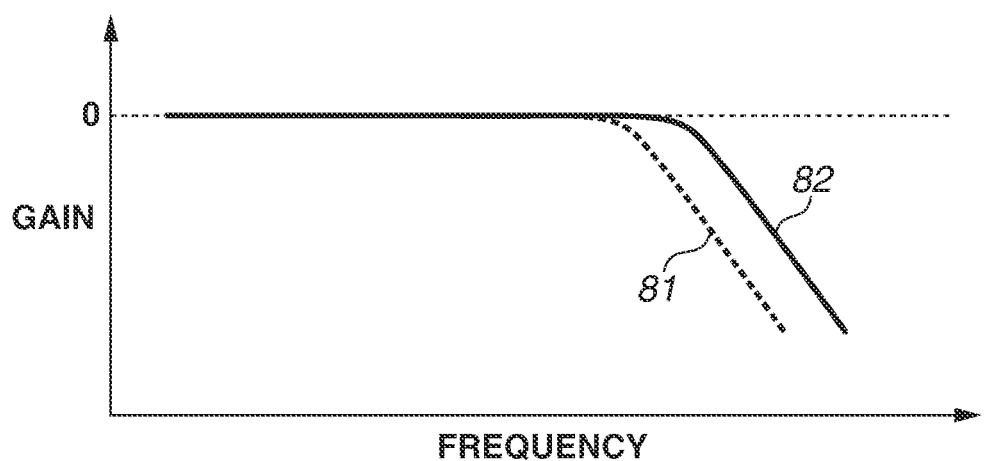
FIG. 8A is a diagram for describing a change of control of the camera shake correction units according to the second exemplary embodiment of the disclosure.

FIG. 8A illustrates the frequency characteristics in a case where the camera-side camera shake correction system and the lens-side camera shake correction system correct camera shake in a shared manner using the foregoing first method. As in FIG. 4A, the vertical axis indicates the gain, and the horizontal axis indicates the frequency. As illustrated in FIG. 8A, the frequency characteristics of the camera- and lens-side camera shake correction systems are often designed to each cover the entire frequency band of camera shake correction so that each of the camera shake correction systems can operate singly. In FIG. 8A, a frequency characteristic 81 of the camera-side camera shake correction unit 14 and a frequency characteristic 82 of the lens-side camera shake correction unit 13 are designed to cover similar frequency bands. In fact, the frequency characteristics of the two camera shake correction systems are different because of characteristics such as the weights of the members (movable members) moved in making camera shake corrections and the sizes of the driving units. FIG. 8A illustrate that the frequency characteristic 82 of the lens-side camera shake correction unit 13 with lighter movable members can cover higher frequencies (in other words, has higher responsiveness).

Figure 8B:
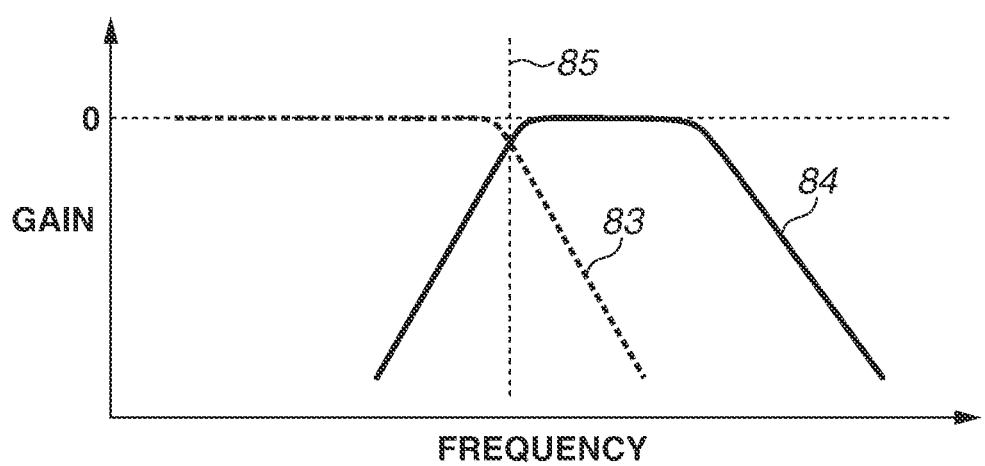
FIG. 8B is a diagram for describing a change of control of the camera shake correction units according to the second exemplary embodiment of the disclosure.

FIG. 8B illustrates the frequency characteristics of the respective camera shake correction systems in a case where the camera-side camera shake correction system and the lens-side camera shake correction system correct camera shake in a shared manner using the foregoing second method. Again, the vertical axis indicates the gain, the horizontal axis indicates the frequency. As illustrated in FIG. 8B, a frequency characteristic 83 of the camera-side camera shake correction unit 14 corresponds to the frequency characteristic through (1−HPF) with a certain cutoff frequency 85. Meanwhile, a frequency characteristic 84 of the lens-side camera shake correction unit 13 corresponds to the frequency characteristic through the HPF 71 with the certain cutoff frequency 85, as illustrated in FIG. 7B. As illustrated in FIG. 8A, the camera shake correction systems have different frequency bands suitable for correction. In the present exemplary embodiment, if the shutter speed is high and high-frequency camera shake is visually noticeable, the lens-side camera shake correction unit 13 suitable for camera shake correction in the high frequency band (i.e., with higher responsiveness) is thus used to correct camera shake in the high frequency band. The camera-side camera shake correction unit 14 less suitable for camera shake correction in the high frequency band than the lens-side camera shake correction unit 13 (i.e., with lower responsiveness and likely to leave camera shake uncorrected in the high frequency band) is then used to correct camera shake in the low frequency band. In other words, in the first method, the camera-side camera shake correction unit 14 having the frequency characteristic 81 is also used to share the camera shake corrections in the high frequency band but with a lower gain. By contrast, in the second method, the camera shake in the high frequency band is corrected by the lens-side camera shake correction unit 13 with higher responsiveness. Driving the two camera shake correction units by sharing the frequencies thus can reduce the amount of camera shake left uncorrected compared to the first method, even in situations where high-frequency camera shake is input as in a case where the shutter speed is high. The frequency characteristic 83 of the camera-side camera shake correction unit 14 and the frequency characteristic 84 of the lens-side camera shake correction unit 13 overlap at frequencies near the cutoff frequency 85. The camera-side camera shake correction unit 14 thus corrects part of the camera shake at frequencies higher than the cutoff frequency 85. However, in the present exemplary embodiment, the frequency band for the camera-side camera shake correction unit 14 to make corrections in is regarded to be one lower than the cutoff frequency 85 (first frequency band). Similarly, the frequency band for the lens-side camera shake correction unit 13 to make corrections in is regarded to be one higher than the cutoff frequency 85 (second frequency band). In other words, the cutoff frequency 85 is regarded as a border between the camera shake to be corrected by the camera-side camera shake correction unit 14 and the camera shake to be corrected by the lens-side camera shake correction unit 13.

Figure 9:
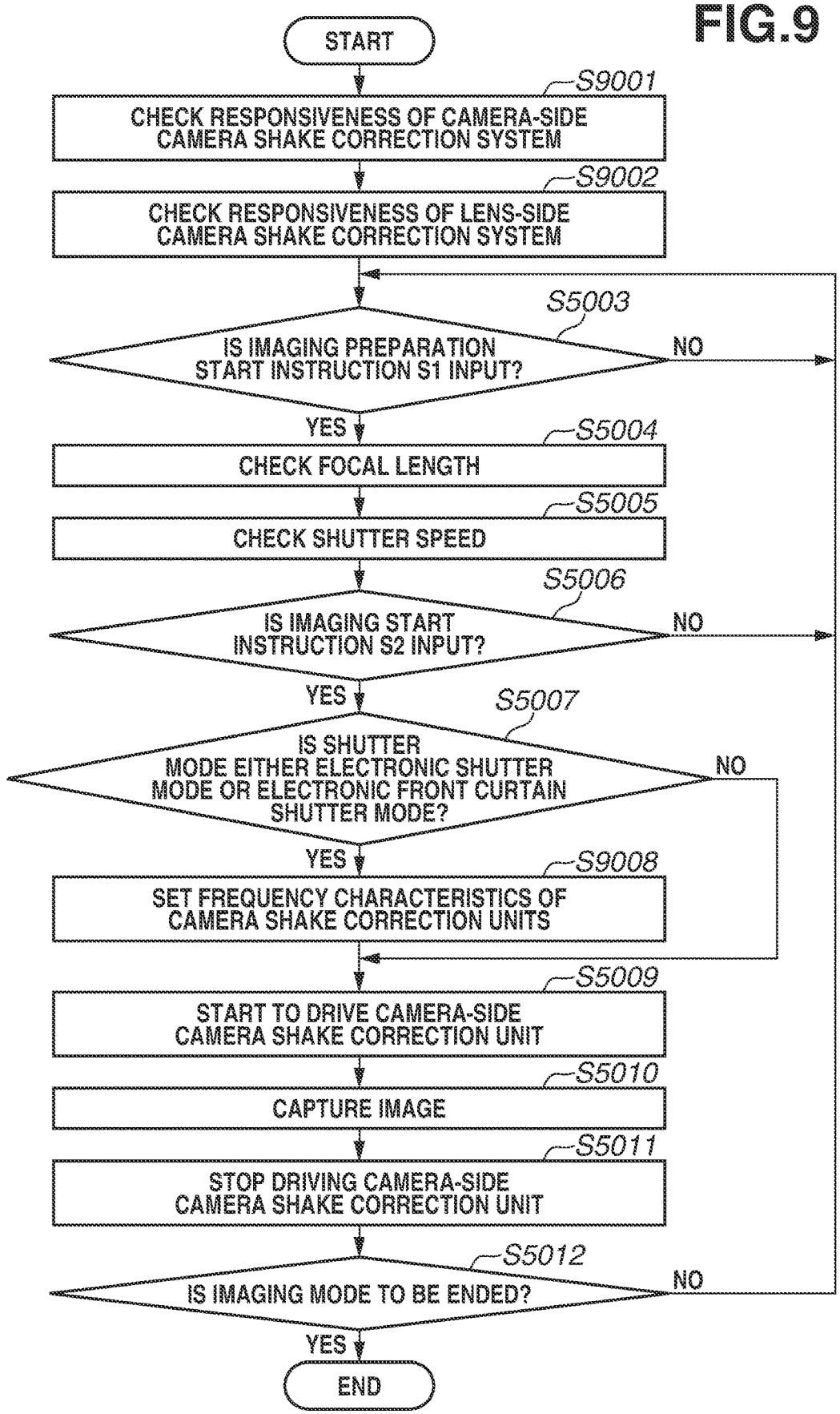
FIG. 9 is a control flowchart according to the second exemplary embodiment of the disclosure.

Next, an antivibration control procedure for the camera main body 1 according to the present exemplary embodiment will be described with reference to FIG. 9. Only differences of the antivibration control flowchart according to the present exemplary embodiment from that illustrated in FIG. 5 will be described. As in FIG. 5, the procedure is started upon power-on of the imaging system 100, and performed by the camera system control unit 5 obtaining various types of information from the components in the camera main body 1 and from the lens system control unit 12 and controlling the components.

In step S9001, the camera system control unit 5 checks the responsiveness of the camera-side camera shake correction system. The processing proceeds to step S9002. In step S9002, the camera system control unit 5 communicates with the lens system control unit 12 via the electrical contacts 11, and checks the responsiveness of the lens-side camera shake correction system. The processing proceeds to step S5003. As described above as information for the responsiveness determination unit 61 to refer to, the responsiveness checked in steps S9001 and S9002 may be any of the following information about the responsiveness of the camera shake correction systems and information based thereon: the weights of the movable parts of the camera- and lens-side camera shake correction units 14 and 13, the frequency response (motor driving characteristics) thereof, and the sensitivity characteristics of the camera- and lens-side camera shake detection units 15 and 16. The processing of steps S5003 to S5007 is similar to that of steps S5003 to S5007 in FIG. 5. A description thereof will thus be omitted. If the responsiveness of the camera shake correction systems is checked in steps S9001 and S9002 and a start instruction for imaging using an electronic front curtain is given (YES in step S5007), the processing proceeds to step S9008.

In step S9008, the camera system control unit 5 sets the responsiveness of the camera shake correction units by determining the sharing method based on the shutter speed and setting the frequency characteristics of the respective camera shake correction units based on the determination result and the responsiveness of the camera shake correction units. The processing proceeds to step S5009.

In step S9008, if the shutter speed is lower than a predetermined value as described above, the camera system control unit 5 sets the responsiveness of the camera shake correction units to provide the frequency characteristics illustrated in FIG. 8A so that camera shake is corrected in a shared manner using the first method. On the other hand, if the shutter speed is higher than or equal to the predetermined value, the camera system control unit 5 sets the responsiveness as illustrated in FIG. 8B. In such a case, camera shake is corrected in a shared manner using the second method where the camera shake correction system determined to have higher responsiveness at high frequencies corrects high-frequency camera shake and the other corrects low-frequency camera shake.

Steps S5009 to S5012 are similar to steps S5009 to S5012 in FIG. 5. A description thereof will thus be omitted.

An antivibration control procedure of the lens apparatus 2 is obtained by replacing steps S6001 and S6002 for checking the resolving power in FIG. 6 with a step of receiving the result of the determination made by the responsiveness determination unit 61 from the camera main body 1. Moreover, step S6007 for setting the responsiveness of the lens-side camera shake correction unit 13 is replaced with a step of setting the responsiveness based on the shutter speed and the responsiveness of the camera shake correction systems as in step S9008. Since the antivibration control flowchart is similar to that of FIG. 6 in other respects, a description thereof will be omitted.

In the present exemplary embodiment described above, both the camera main body 1 and the lens apparatus 2 determine the sharing method of camera shake correction between the camera- and lens-side camera shake correction systems based on the result of the determination made by the responsiveness determination unit 61 and the shutter speed. However, one of the camera main body 1 and the lens apparatus 2 may determine the sharing method and the other thereof may receive the determination result. For example, the camera system control unit 5 may determine which sharing method to use, the first method or the second method, based on the result of the determination made by the responsiveness determination unit 61 and the shutter speed, and transmit the determination result to the lens system control unit 12 via the electrical contacts 11. Here, the lens system control unit 12 receives the information indicating the sharing method from the camera main body 1 instead of the result of the determination made by the responsiveness determination unit 61, and operates the lens-side camera shake correction system using the sharing method instructed by the camera system control unit 5.

In the present exemplary embodiment described above, the sharing method between the camera- and lens-side camera shake correction systems is determined based on the shutter speed. However, the sharing method may be determined based on the resolving power of the imaging system 100 in addition to the shutter speed. The reason is that if the resolving power of the imaging system 100 is low, high-frequency camera shake is visually less observable even at high shutter speed, and the first method can be used without much noticeable camera shake left uncorrected. Suppose, for example, that the second method is employed for sharing if the shutter speed is higher than or equal to the predetermined value as described above. In such a mode, the predetermined value may be increased (made faster) as the resolving power of the imaging system 100 decreases, and decreased (made slower) as the resolving power of the imaging system 100 increases. Alternatively, the first method may be employed if the resolving power of the imaging system 100 is lower than or equal to the predetermined value and the shutter speed is lower than the predetermined value. The second method may be employed if the resolving power of the imaging system 100 is higher than the predetermined value or if the shutter speed is higher than or equal to the predetermined value. At high shutter speed, the amount (cumulative amount) of camera shake occurring during an imaging period is small and the stroke is less likely to be insufficient even if the second method is employed. The second method may therefore be employed regardless of the resolving power as in the present exemplary embodiment described above. Alternatively, as in the first exemplary embodiment, the first method or the second method may be selected based on the resolving power of the imaging system 100 regardless of the shutter speed. In such a case, the second method may be selected if the resolving power of the imaging system 100 is higher than a predetermined value. The first method may be selected if the resolving power of the imaging system 100 is lower than or equal to the predetermined value.

As described above, in the present exemplary embodiment, in correcting camera shake using both the camera-side camera shake correction system and the lens-side camera shake correction system, the sharing method is changed based on the shutter speed and the responsiveness of the respective camera shake correction systems. Consequently, the total responsiveness of camera shake correction by the camera-side camera shake correction system and the lens-side camera shake correction system, i.e., the entire imaging system 100, can be increased under an imaging condition where the shutter speed is high and high-frequency camera shake is noticeable. This enables camera shake correction without much camera shake left uncorrected.

An imaging system according to a third exemplary embodiment of the disclosure will be described below with reference to FIGS. 10A and 10B. The present exemplary embodiment is different from the second exemplary embodiment in the method for changing control of the camera shake correction units.

In the present exemplary embodiment, in correcting camera shake using both a camera-side camera shake correction system and a lens-side camera shake correction system, the second method is used to control the camera shake correction units regardless of the shutter speed. Here, the switching frequency for sharing is changed based on the shutter speed.

A basic configuration is similar to that of the second exemplary embodiment described with reference to FIGS. 7A to 9. Only differences will therefore be described in detail. In the present exemplary embodiment, the gain compensators 73 and 75 are not needed since the dotted-lined routes in the camera-side filter processing unit 5a and the lens-side filter processing unit 12a illustrated in FIGS. 7A and 7B are not needed.

A change in the frequency characteristics of the camera shake correction systems according to the present exemplary embodiment will be described with reference to FIGS. 10A and 10B. In the present exemplary embodiment, as in the second exemplary embodiment, the lens-side camera shake correction unit 13 is assumed to have higher responsiveness. FIGS. 10A and 10B are graphs indicating the frequency characteristics of the camera shake correction units as in FIGS. 8A and 8B. The vertical axes indicate the gain, and the horizontal axes indicate the frequency. FIG. 10A illustrates an example of the frequency characteristics of the camera shake correction systems in the case where the shutter speed is lower than a predetermined value. FIG. 10B illustrates an example of the frequency characteristics of the camera shake correction systems in the case where the shutter speed is higher than the predetermined value.

Figure 10A:
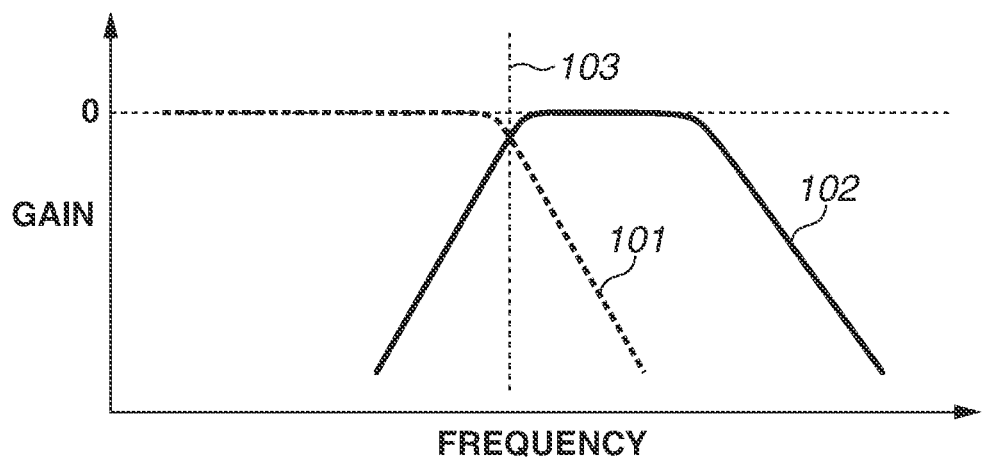
FIG. 10A is a diagram for describing a change of control of camera shake correction units according to a third exemplary embodiment of the disclosure.

In the example illustrated in FIG. 10A, the camera-side camera shake correction unit 14 takes charge of corrections in a frequency band lower than a cutoff frequency 103 of the HPFs 71. The lens-side camera shake correction unit 13 takes charge of corrections in a frequency band higher than the cutoff frequency 103. The camera-side camera shake correction unit 14 has a frequency characteristic 101 indicating that the gain decreases gradually from a frequency somewhat lower than the cutoff frequency 103 with increase in frequency. Meanwhile, the lens-side camera shake correction unit 13 has a frequency characteristic 102 indicating that the gain decreases gradually from a frequency somewhat higher than the cutoff frequency 103 with decrease in frequency.

Figure 10B:
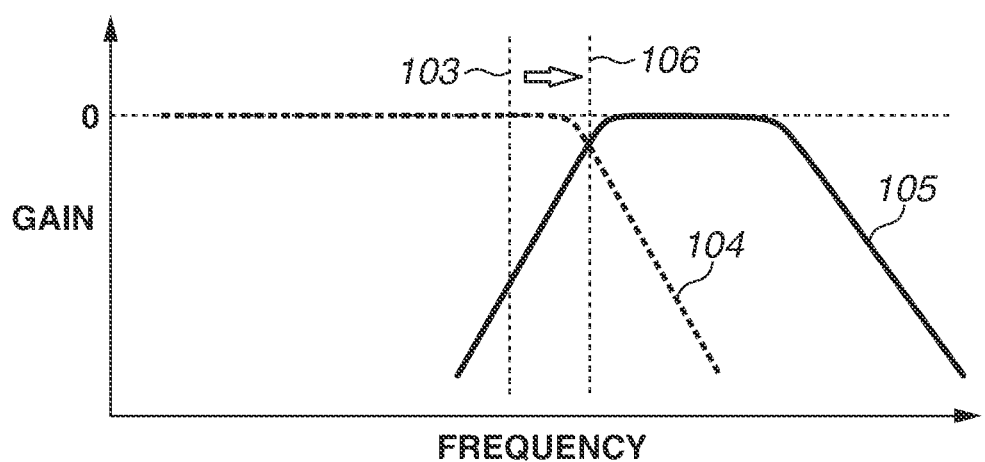
FIG. 10B is a diagram for describing a change of control of the camera shake correction units according to the third exemplary embodiment of the disclosure.

In the example illustrated in FIG. 10B, a cutoff frequency 106 higher than the cutoff frequency 103 illustrated in FIG. 10A is set as the cutoff frequency of the HPFs 71. The camera-side camera shake correction unit 14 thus has a frequency characteristic 104 indicating that the gain decreases gradually from a frequency somewhat lower than the cutoff frequency 106 with increase in frequency. Meanwhile, the lens-side camera shake correction unit 13 has a frequency characteristic 105 indicating that the gain decreases gradually from a frequency somewhat higher than the cutoff frequency 106 with decrease in frequency.

As described in the second exemplary embodiment, the camera shake correction systems have respective frequency bands suitable for camera shake correction. For example, the lens-side camera shake correction system with a less movable part weight can have favorable camera shake correction performance at high frequencies compared to the camera-side camera shake correction system.

If the shutter speed is high, the exposure period of the image sensor 6 is short and camera shake during the exposure period is mainly in a high frequency band. Thus, if the shutter speed is high, camera shake left uncorrected can be further reduced by correcting high-frequency camera shake using the lens-side camera shake correction unit 13 having higher responsiveness and low-frequency camera shake using the camera-side camera shake correction unit 14.

On the other hand, if the shutter speed is low, the amount of camera shake typically tends to increase.

In addition, the amount of camera shake tends to increase at lower frequencies. Due to such reasons, if the shutter speed is low and the cutoff frequency at which the frequencies are divided for camera shake correction is high, the camera shake correction system in charge of lower frequencies can run short of the correction stroke. In the present exemplary embodiment, if the shutter speed is lower than a predetermined value, the camera shake correction systems therefore correct camera shake by sharing the frequencies as illustrated in FIG. 10A. On the other hand, if the shutter speed is higher than or equal to the predetermined value, the characteristics of the camera shake correction systems are changed so that, as illustrated in FIG. 10B, the cutoff frequency 106 is set to a frequency higher than the cutoff frequency 103 in FIG. 10A.

As has been described above, in correcting camera shake by sharing the frequencies using both the camera-side camera shake correction system and the lens-side camera shake correction system, camera shake left uncorrected can be reduced by changing the cutoff frequency to divide the frequencies at based on the shutter speed. Moreover, as in the second exemplary embodiment, the frequency characteristics may be changed based not only on the shutter speed but also on the resolving power of the imaging system 100 based on the resolving power of the imaging optical system 3 and the image sensor 6. Alternatively, the frequency characteristics may be changed based on the resolving power of the imaging system 100 instead of the shutter speed.

An imaging system according to a fourth exemplary embodiment of the disclosure will be described below with reference to FIGS. 11A and 11B. The fourth exemplary embodiment is different from the second exemplary embodiment in the method for changing control of camera shake correction systems. In the present exemplary embodiment, in correcting camera shakes using both a camera-side camera shake correction system and a lens-side camera shake correction system, the control characteristic of one of the camera shake correction systems with higher responsiveness at high frequencies (here, the lens-side camera shake correction system) is changed based on the shutter speed. Since a basic configuration is similar to that of the second exemplary embodiment described with reference to FIGS. 6 to 9, only differences will be described in detail.

A change in the control characteristics of the camera shake correction systems according to the present exemplary embodiment will be described with reference to FIGS. 11A and 11B. FIG. 11A illustrates an example of the frequency characteristics of the camera shake correction systems in the case of control by sharing the driving amounts between the two camera shake correction systems (the first method according to the second exemplary embodiment). FIG. 11B illustrates an example of the frequency characteristics of the camera shake correction systems in the case of control by sharing the frequencies between the two camera shake correction systems (the second method according to the second exemplary embodiment). In both of FIGS. 11A and 11B, the vertical axis indicates the gain, and the horizontal axis the frequency.

Figure 11A:
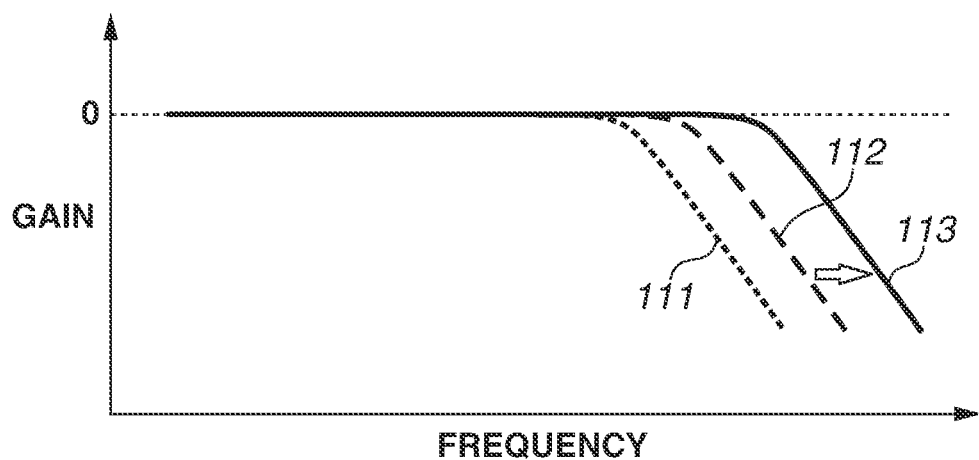
FIG. 11A is a diagram for describing a change of control of camera shake correction units according to a fourth exemplary embodiment of the disclosure.

FIG. 11A illustrates the frequency characteristics for the case of control using the first method, where a frequency characteristic 111 of the camera-side camera shake correction unit 14 and a frequency characteristic 112 of the lens-side camera shake correction unit 13 overlap for the most part. Moreover, in the present exemplary embodiment, if the shutter speed is lower than a predetermined value, the frequency characteristic 112 of the lens-side camera shake correction unit 13 is changed to a frequency characteristic 113 having higher responsiveness than that of the frequency characteristic 112.

If the imaging system 100 is under the imaging condition where the shutter speed is high and high-frequency camera shake is noticeable, the responsiveness of camera shake correction can thereby be made higher than if not.

Figure 11B:
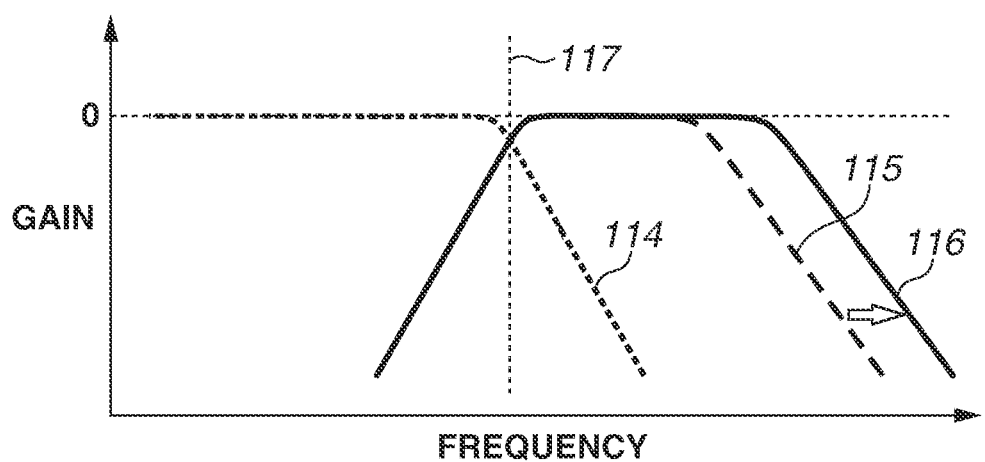
FIG. 11B is a diagram for describing a change of control of the camera shake correction units according to the fourth exemplary embodiment of the disclosure.

FIG. 11B illustrates the frequency characteristics for the case of control using the second method, where a frequency characteristic 114 of the camera-side camera shake correction unit 14 is set to correct camera shake mostly in a frequency band lower than a cutoff frequency 117. Similarly, a frequency characteristic 115 of the lens-side camera shake correction unit 13 is set to correct camera shake in a frequency band higher than the cutoff frequency 117. Moreover, in the present exemplary embodiment, if the shutter speed is lower than a predetermined value, the frequency characteristic of the lens-side camera shake correction unit 13 is changed to a frequency characteristic 116 having higher responsiveness than that of the frequency characteristic 112. If the imaging system 100 is under the imaging condition where the shutter speed is high and high-frequency camera shake is noticeable, the responsiveness of camera shake correction can thereby be made higher than if not.

As described above, in the present exemplary embodiment, the frequency characteristic of one of the camera shake correction systems is changed based on the shutter speed. Basically, if the shutter speed is high, the frequency characteristic of the camera shake correction system having higher responsiveness at high frequencies is changed to further improve the frequency characteristics at high frequencies. Specifically, the parameter of the camera shake correction unit is changed to increase the gain at high frequencies. This can improve the responsiveness of the camera shake correction unit at high frequencies, and enables accurate camera shake correction even if the shutter speed is high (high-frequency camera shake is input).

In the present exemplary embodiment, the responsiveness of the imaging system 100 is described to be changed by changing the frequency characteristic of the lens-side camera shake correction unit 13. Alternatively, the frequency characteristic of the camera-side camera shake correction unit 14 may be changed.

As has been described above, in correcting camera shake using both the camera-side camera shake correction system and the lens-side camera shake correction system, camera shake left uncorrected can be reduced by changing the frequency characteristic of one of the camera shake correction units based on the shutter speed. Moreover, as in the second exemplary embodiment, the frequency characteristic may be changed based not on the shutter speed but also on the resolving power of the imaging system 100 based on the resolving power of the imaging optical system 3 and the image sensor 6. Alternatively, the frequency characteristic may be changed based on the resolving power of the imaging system 100 instead of the shutter speed.

An imaging system according to a fifth exemplary embodiment of the present invention will be described below with reference to FIG. 12. The present exemplary embodiment is different from the first exemplary embodiment in the method for changing responsiveness of the camera shake correction systems. A basic configuration of the imaging system is similar to that of the first exemplary embodiment described with reference to FIGS. 1A to 5. Only differences will therefore be described in detail.

In the present exemplary embodiment, the control characteristic (responsiveness) of the camera shake correction systems is changed based on whether an imaging mode selection unit selects a single-image capture mode or a burst capture mode as an imaging mode, in addition to the resolving power of the image sensor 6 or the imaging optical system 3.

The single-image capture mode refers to a mode in which the imaging apparatus captures a single image upon transition from a state where an imaging preparation start instruction (half-pressing of the shutter release button) S1 is input to the imaging apparatus to a state where an imaging start instruction (full-pressing of the shutter release button) S2 is input. The burst capture mode refers to a mode in which the imaging apparatus continuously captures a plurality of images while the imaging start instruction S2 is input to the imaging apparatus. In the burst capture mode, relatively high shutter speed is often set compared to that in the single-image capture mode. In correcting camera shakes, priority can therefore be given to the correction of small camera shake found to be noticeable at high shutter speed settings over the correction of camera shake conventionally corrected. In the present exemplary embodiment, camera shake corrections tailored to the respective imaging modes are performed by changing the control characteristic of the camera shake correction systems depending on the imaging mode.

A procedure for changing the control characteristic of the camera shake correction systems according to the present exemplary embodiment will be described with reference to FIG. 12. As in FIG. 5, FIG. 12 illustrates an antivibration control procedure for the camera main body 1. Only differences from FIG. 5 will be described in detail. As in FIG. 5, the procedure is started upon power-on of the imaging system 100, and performed by the camera system control unit 5 obtaining various types of information from the components in the camera main body 1 and from the lens system control unit 12 and controlling the components.

The processing of steps S5001 to S5006 is similar to that of the first exemplary embodiment. A description thereof will thus be omitted. In step S5006, if the camera system control unit 5 determines that the imaging start instruction S2 is input by the user (YES in step S5006), the processing proceeds to step S1201. In step S1201, the camera system control unit 5 determines whether the burst capture mode is selected as the imaging mode. If the burst capture mode is selected (YES in step S1201), the processing proceeds to step S1202. If the burst capture mode is not selected (NO in step S1201), the processing proceeds to step S5009. The imaging mode may be selected by the user operating an operation unit or automatically set by the imaging apparatus based on the scene. If the user selects the imaging mode by operating the operation unit, the imaging mode of the imaging system 100 (camera main body 1) is selected by the operation detection unit 10 detecting an imaging mode selection operation and the camera system control unit 5 receiving input of a detection result and selecting the imaging mode.

In step S1202, the camera system control unit 5 changes the responsiveness of the camera-side camera shake correction unit 14 based on the resolving power of the entire imaging system 100. The method for obtaining the resolving power of the imaging system 100 is similar to that in step S5008 of the first exemplary embodiment. The camera system control unit 5 obtains the resolving power of the entire imaging system 100 based on the resolving power of the image sensor 6 referred to in step S5001, the resolving power of the imaging optical system 3 referred to in step S5002, and the focal length referred to in step S5004. The camera system control unit 5 then changes the driving control parameters as in FIGS. 4A and 4B so that the higher the resolving power of the imaging system 100, the higher the responsiveness of the camera-side camera shake correction unit 14. The camera system control unit 5 may change the driving control parameters so that the responsiveness increases with the resolving power of the imaging system 100, or so that the responsiveness is higher if the resolving power is higher than or equal to a threshold than if the resolving power is lower than the threshold. The driving control parameters are desirably changed so that the responsiveness is higher if this step is taken (the burst capture mode is selected) than if this step is skipped (the burst capture mode is not selected). However, if the resolving power of the imaging system 100 is not high, the responsiveness with the burst capture mode selected and the responsiveness with the single-image capture mode selected may be the same. After the change of the responsiveness, the processing proceeds to step S5009. The processing of steps S5009 to S5012 is also similar to that of the first exemplary embodiment. A description thereof will thus be omitted.

Figure 12:
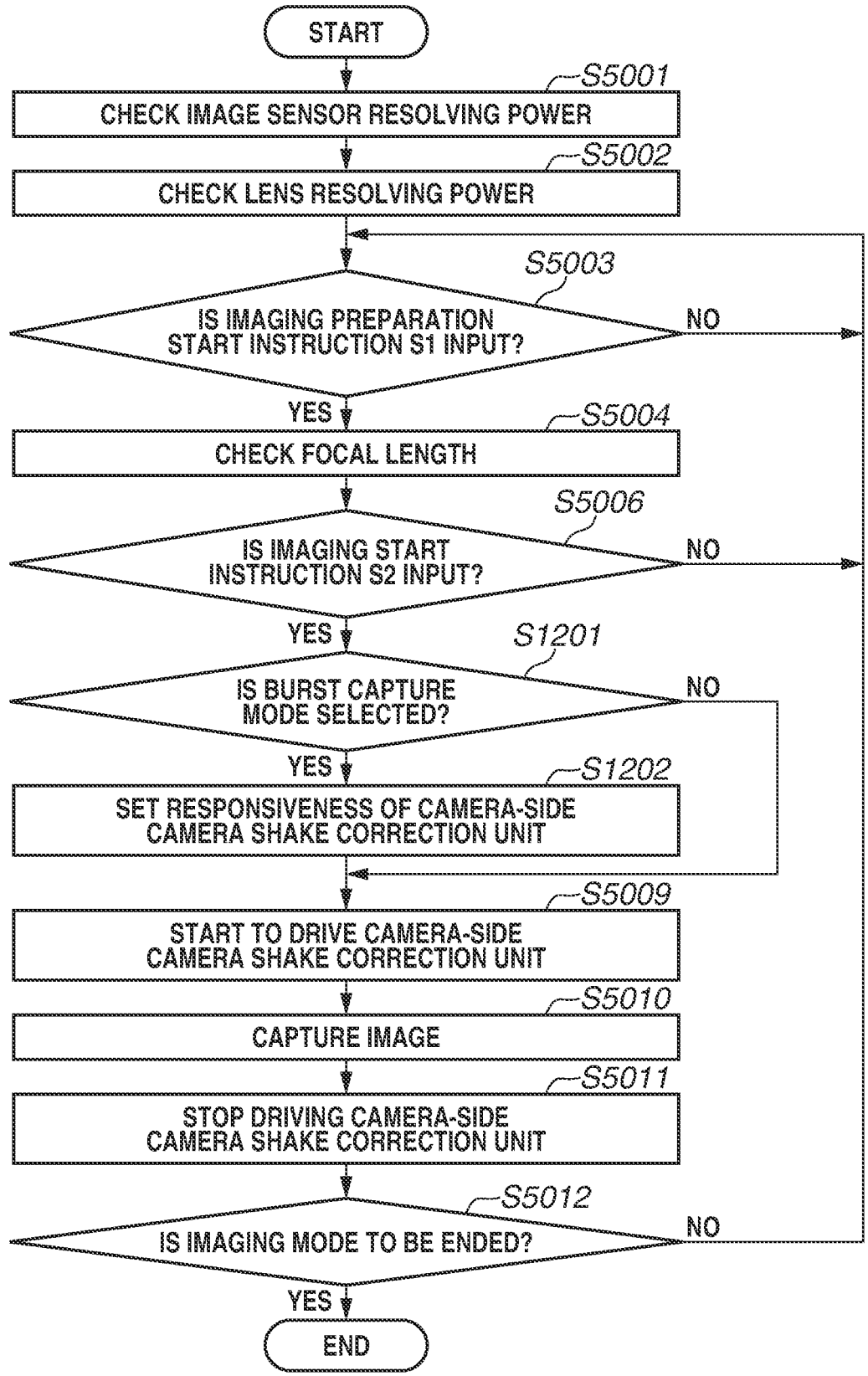
FIG. 12 is a control flowchart according to a fifth exemplary embodiment of the disclosure.

In FIG. 12, the control procedure is described in which the responsiveness is not changed by the camera system control unit 5 checking the shutter speed as in step S5005 of FIG. 5. However, the shutter speed may be checked also in the present exemplary embodiment. Further, the determination processing of step S1201 may be inserted before or after step S5007 of FIG. 5 so that the processing proceeds to step S1202 if the shutter mode is the electronic shutter mode and the imaging mode is the burst capture mode. Moreover, the responsiveness can be set (changed) by a method of changing the sharing method or changing the sharing frequencies as described in the second to fourth exemplary embodiments. For example, if the burst capture mode is set and the resolving power of the imaging system 100 is higher than a predetermined value, the second method for sharing the frequencies to make corrections at between the correction units may be employed. If the resolving power is lower than or equal to the predetermined value, the first method where the correction units correct camera shake as much as an amount based on their respective sharing ratios may be employed.

Similar to the antivibration control procedure for the camera main body 1, an antivibration control procedure for the lens apparatus 2 according to the present exemplary embodiment is such that step S5005 of FIG. 5 is omitted and steps S5007 and S5008 are replaced with steps S1201 and S1202, respectively.

As with the antivibration control procedure for the camera main body 1, step S5005 may be left present. Step S1201 may be performed in addition to step S5007.

As described above, the characteristics of the camera shake correction units are switched based on the resolving power of the image sensor 6 or the imaging optical system 3. In a system using a lens or an image sensor having high resolving power, camera shake corrections suitable for imaging with the resolving power can thus be made. In addition, the responsiveness of the camera shake correction units is changed depending on the imaging mode so that noticeable camera shake can be corrected based on the imaging conditions.

An imaging system according to a sixth exemplary embodiment of the present invention will be described below with reference to FIGS. 13 and 14. The present exemplary embodiment is different from the first exemplary embodiment in the method for changing the responsiveness of the camera shake correction systems. A basic configuration of the imaging system is similar to that of the first exemplary embodiment described with reference to FIGS. 1A to 5. Only differences will therefore be described in detail.

In the present exemplary embodiment, the control characteristic (responsiveness) of the camera shake correction systems is changed based on whether an electronic flash (light emitting unit) is used for imaging, in addition to the resolving power of the image sensor 6 or the imaging optical system 3. The electronic flash is not limited to one emitting flash light and also covers ones emitting continuous light.

If the electronic flash is used for imaging, relatively high shutter speed is often set. In correcting camera shakes, priority can therefore be given to the correction of small camera shake found to be noticeable at high shutter speed settings over the correction of camera shake conventionally corrected. In the present exemplary embodiment, the control characteristic of the camera shake correction systems is therefore changed based on whether the electronic flash is used for imaging.

Figure 14:
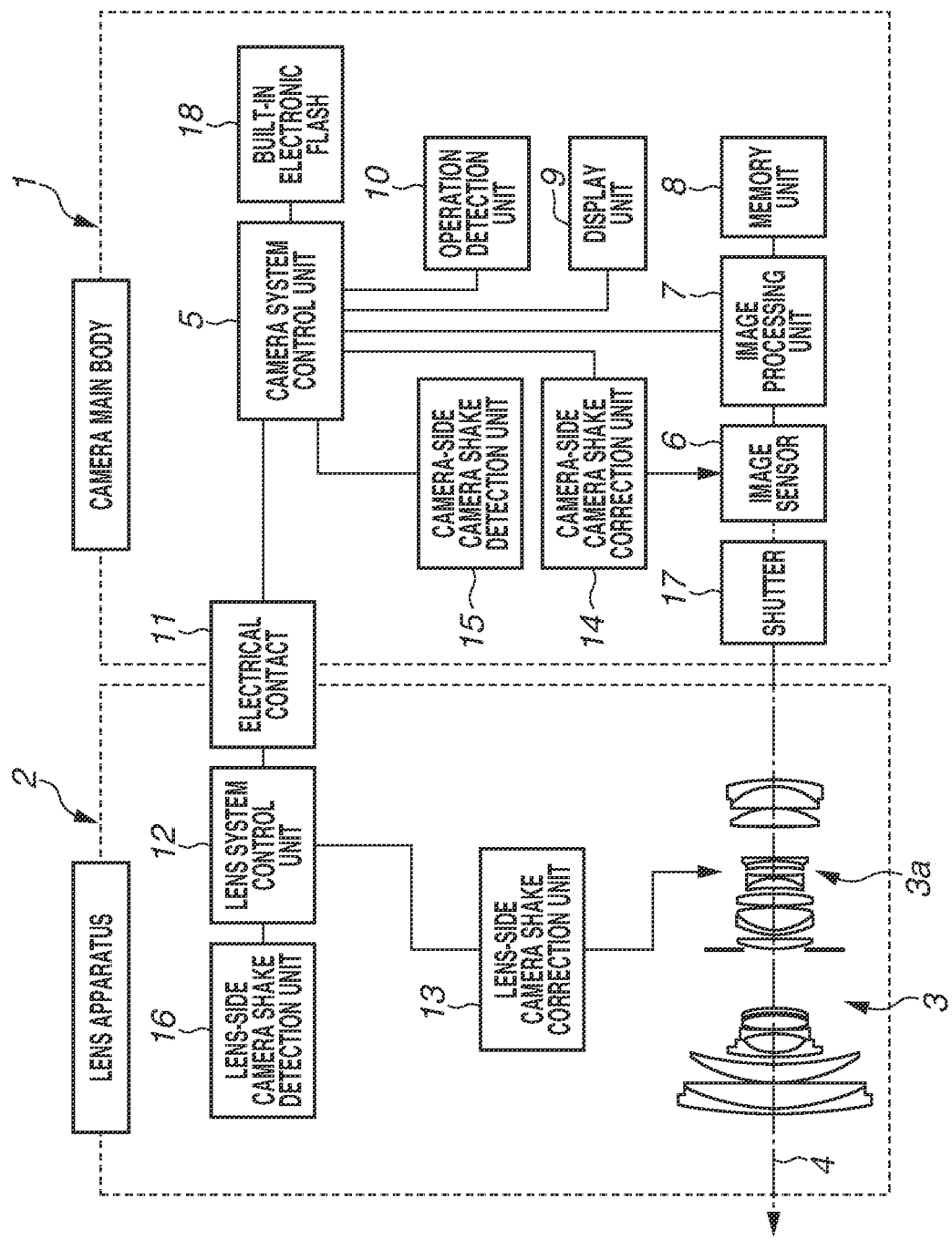
FIG. 14 is a block diagram illustrating an imaging system according to the fifth exemplary embodiment of the disclosure.

FIG. 14 illustrates a configuration of the imaging system 100 according to the present exemplary embodiment. The configuration is basically the same as that of the first exemplary embodiment. A difference from the first exemplary embodiment (FIG. 1B) is that a built-in electronic flash 18 is included. An external electronic flash may be used instead of the built-in electronic flash 18. In such a case, the external electronic flash is connected to the camera system control unit 5, and the camera system control unit 5 is configured to retain information about whether the external electronic flash emits light during imaging.

A procedure for changing the control characteristic of the camera shake correction systems according to the present exemplary embodiment will be described with reference to FIG. 13. As in FIG. 5, FIG. 13 illustrates an antivibration control procedure for the camera main body 1. Only differences from FIG. 5 will be described in detail. As in FIG. 5, the procedure is started upon power-on of the imaging system 100, and performed by the camera system control unit 5 obtaining various types of information from the components in the camera main body 1 and from the lens system control unit 12 and controlling the components.

The processing of steps S5001 to S5006 is similar to that of the first exemplary embodiment. A description thereof will thus be omitted. In step S5006, if the camera system control unit 5 determines that the imaging start instruction S2 is input by the user (YES in step S5006), the processing proceeds to step S1301. In step S1301, the camera system control unit 5 determines whether to use the electronic flash (built-in electronic flash 18) during imaging. If the electronic flash is used (YES in step S1301), the processing proceeds to step S1302. If the electronic flash is not used (NO in step S1301), the processing proceeds to step S5009.

In step S1302, the camera system control unit 5 changes the responsiveness of the camera-side camera shake correction unit 14 based on the resolving power of the entire imaging system 100. The method for obtaining the resolving power of the imaging system 100 is similar to that in step S5008 of the first exemplary embodiment. The camera system control unit 5 obtains the resolving power of the entire imaging system 100 based on the resolving power of the image sensor 6 referred to in step S5001, the resolving power of the imaging optical system 3 referred to in step S5002, and the focal length referred to in step S5004. The camera system control unit 5 then changes the driving control parameters as in FIGS. 4A and 4B so that the higher the resolving power of the imaging system 100, the higher the responsiveness of the camera-side camera shake correction unit 14. The camera system control unit 5 may change the driving control parameters so that the responsiveness increases with the resolving power of the imaging system 100, or so that the responsiveness is higher if the resolving power is higher than or equal to a threshold than if the resolving power is lower than the threshold. The driving control parameters are desirably changed so that the responsiveness is higher if this step is taken (the electronic flash is set to be used for imaging) than if this step is skipped (the electronic flash is not set to be used for imaging). However, if the resolving power of the imaging system 100 is not high, the responsiveness when the electronic flash is used and the responsiveness when the electronic flash is not used may be the same. After the change of the responsiveness, the processing proceeds to step S5009. The processing of steps S5009 to S5012 is also similar to that of the first exemplary embodiment. A description thereof will thus be omitted.

Figure 13:
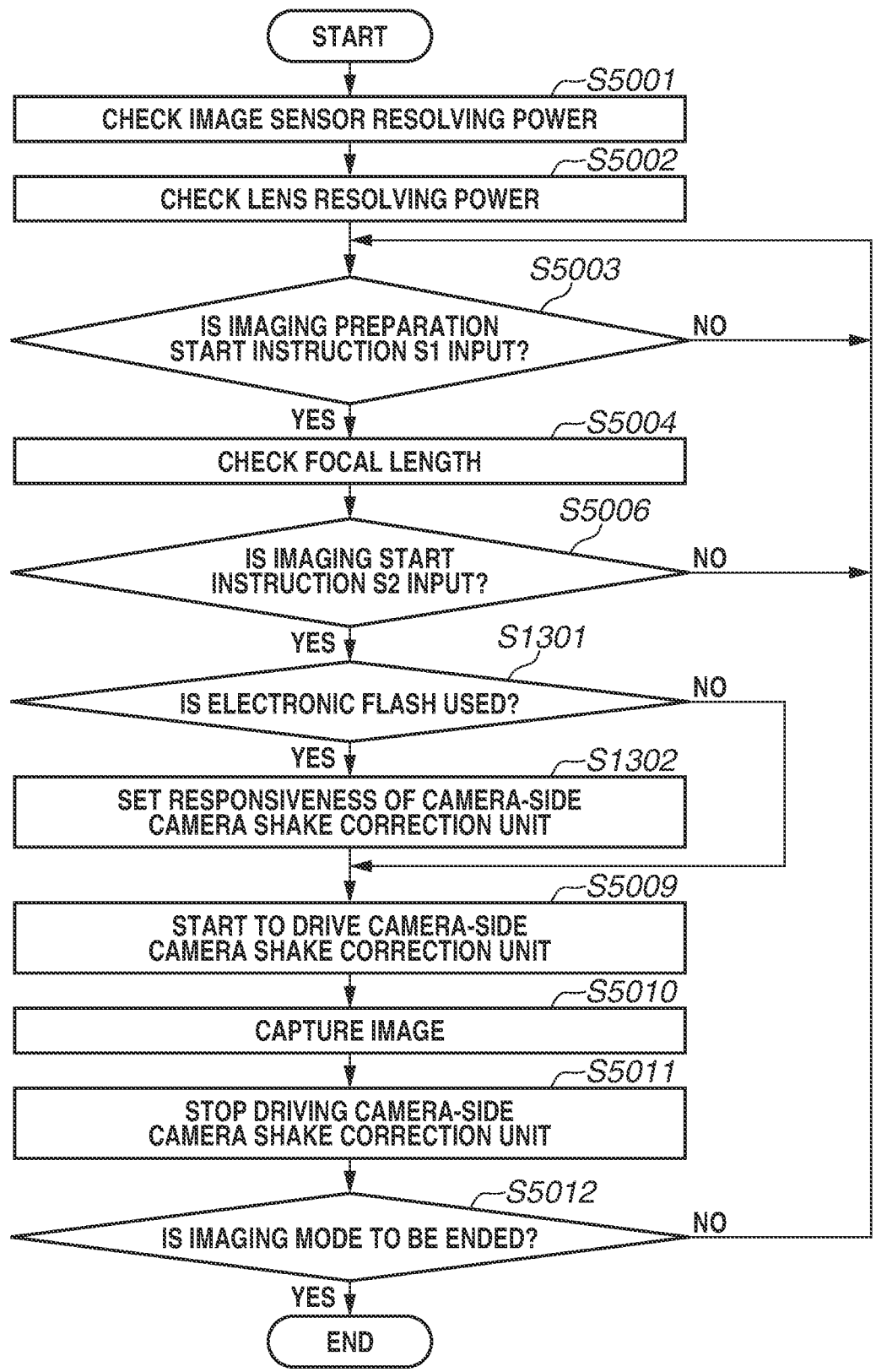
FIG. 13 is a control flowchart according to a sixth exemplary embodiment of the disclosure.

In FIG. 13, the control procedure is described in which the responsiveness is not changed by the camera system control unit 5 checking the shutter speed as in step S5005 of FIG. 5. However, the shutter speed may be checked also in the present exemplary embodiment. Further, the determination processing of step S1301 may be inserted before or after step S5007 of FIG. 5 so that the processing proceeds to step S1302 if the shutter mode is the electronic shutter mode and the imaging mode is the burst capture mode. Moreover, the responsiveness can be set (changed) by a method of changing the sharing method or changing the sharing frequencies as described in the second to fourth exemplary embodiments. For example, if the burst capture mode is set to be used for imaging and the resolving power of the imaging system 100 is higher than a predetermined value, the second method for sharing the frequencies to make corrections at between the correction units may be employed. If the resolving power is lower than or equal to the predetermined value, the first method where the correction units correct camera shake as much as an amount based on their respective sharing ratios may be employed.

Similar to the antivibration control procedure for the camera main body 1, an antivibration control procedure for the lens apparatus 2 according to the present exemplary embodiment is such that step S5005 of FIG. 5 is omitted and steps S5007 and S5008 are replaced with steps S1301 and S1302, respectively.

As with the antivibration control procedure for the camera main body 1, step S5005 may be left present.

As described above, the characteristics of the camera shake correction units are switched based on the resolving power of the image sensor 6 or the imaging optical system 3. In a system using a lens or an image sensor having high resolving power, camera shake corrections suitable for imaging with the resolving power can thus be made. In addition, the responsiveness of the camera shake correction units is changed depending on whether the electronic flash is used for imaging so that noticeable camera shake can be corrected based on the imaging conditions.

While the exemplary embodiments of the present invention have been described above, the present invention is not limited to the exemplary embodiments, and various modifications and changes may be made without departing from the gist thereof.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-008838, filed Jan. 24, 2022, which is hereby incorporated by reference herein in its entirety.

What is claimed is:

1. An image stabilization control apparatus comprising at least one processor or circuit which functions as:
   an obtaining unit configured to obtain resolving power of an imaging system based on information indicating resolving power of an imaging optical system included in a lens apparatus and information indicating resolving power of an image sensor configured to capture an object image formed by the lens apparatus;
   a control unit configured to control a correction unit configured to correct an effect of shake acting on an imaging apparatus to which the lens apparatus is attached on the captured image; and
   a setting unit configured to set responsiveness of the correction unit controlled by the control unit based on the resolving power of the imaging system and an imaging condition,
   wherein the setting unit is configured to, in a case where the imaging condition satisfies a predetermined condition and the resolving power of the imaging system has a first value, set the responsiveness of the correction unit to be higher than in a case where the resolving power has a second value less than the first value, and
   wherein the predetermined condition is either a condition that the imaging system is set to a burst capture mode or a condition that a light emitting unit is set to emit light during imaging, or both.

2. The image stabilization control apparatus according to claim 1, wherein the predetermined condition is that the imaging system is set to a burst capture mode.

3. The image stabilization control apparatus according to claim 1, wherein the predetermined condition is that a light emitting unit is set to emit light during imaging.

4. The image stabilization control apparatus according to claim 1, wherein the setting unit is configured to increase the responsiveness by increasing a control gain in at least part of a frequency band.

5. The image stabilization control apparatus according to claim 1, wherein the setting unit is configured to increase the responsiveness by advancing a phase in at least a first frequency band.

6. The image stabilization control apparatus according to claim 1, wherein the information indicating the resolving power of the image sensor is based on a pixel pitch of the image sensor.

7. The image stabilization control apparatus according to claim 1, wherein the setting unit is configured to set responsiveness of a shake correction operation performed during exposure of the imaging apparatus based on the resolving power of the imaging system.

8. The image stabilization control apparatus according to claim 1, wherein the information indicating the resolving power of the imaging optical system is based on a modulation transfer function (MTF) curve representing contrast of the imaging optical system at each spatial frequency.

9. The image stabilization control apparatus according to claim 1, wherein the information indicating the resolving power of the imaging optical system is changed based on a change in a focal length of the imaging optical system.

10. The image stabilization control apparatus according to claim 1, wherein the setting unit is configured to increase the responsiveness of the correction unit as the resolving power of the imaging system increases.

11. The image stabilization control apparatus according to claim 1,
wherein the control unit is configured to control a first shake correction unit included in the lens apparatus and a second shake correction unit included in the imaging apparatus to which the lens apparatus is attached, and
wherein the setting unit is configured to set responsiveness of at least one of the first and second shake correction units based on the resolving power of the imaging system.

12. The image stabilization control apparatus according to claim 1,
wherein the control unit is configured to control a first shake correction unit included in the lens apparatus and a second shake correction unit included in the imaging apparatus to which the lens apparatus is attached, and
wherein the setting unit is configured to, in a case where the imaging condition satisfies the predetermined condition, set responsiveness of at least one of the first and second shake correction units based on the resolving power of the imaging system.

13. The image stabilization control apparatus according to claim 12,
wherein the control unit is configured to control the first shake correction unit and the second shake correction unit by using a first method where the first shake correction unit and the second shake correction unit correct respective portions of shake acting on the imaging apparatus based on a sharing ratio and a second method where the first shake correction unit corrects a portion of the shake acting on the imaging apparatus within a first frequency band and the second shake correction unit corrects a portion of the shake within a second frequency band different from the first frequency band, and
wherein the setting unit is configured to, in the case where the imaging condition satisfies the predetermined condition, set the responsiveness by setting a sharing method selected from a plurality of sharing methods including at least the first method and the second method based on the resolving power of the imaging system.

14. The image stabilization control apparatus according to claim 13, wherein the setting unit is configured to compare the responsiveness of the first shake correction unit with that of the second shake correction unit and, in a case where the responsiveness of the first shake correction unit is determined to be higher, set the first frequency band to higher frequencies than the second frequency band and, in a case where the responsiveness of the second shake correction unit is determined to be higher, set the second frequency band to lower frequencies than the first frequency band.

15. The image stabilization control apparatus according to claim 12,
wherein the control unit is configured to control the first shake correction unit and the second shake correction unit so that the first shake correction unit corrects a portion of the shake acting on the imaging apparatus within a first frequency band and the second shake correction unit corrects a portion of the shake within a second frequency band different from the first frequency band, and
wherein the setting unit is configured to set the responsiveness by setting a border frequency between the first frequency band and the second frequency band based on the resolving power of the imaging system.

16. An imaging apparatus to which a lens apparatus is attached, the imaging apparatus comprising:
the image stabilization control apparatus according to claim 1;
the image sensor; and
a second shake correction unit configured to correct the effect of the shake acting on the imaging apparatus on a captured image by moving the image sensor,
wherein the setting unit is configured to set responsiveness of the second shake correction unit.

17. A lens apparatus to be attached to an imaging apparatus, the lens apparatus comprising:
the image stabilization correction control apparatus according to claim 1;
the imaging optical system; and
a first shake correction unit configured to correct an effect of shake acting on the imaging apparatus on a captured image by moving one or some of optical elements constituting the imaging optical system,
wherein the setting unit is configured to set responsiveness of the first shake correction unit based on the resolving power of the imaging system.

18. An imaging apparatus to which a lens apparatus including an imaging optical system is attached, the imaging apparatus comprising:
a communication unit configured to communicate with the lens apparatus;
an image sensor; and
at least one processor or circuit which functions as:
an obtaining unit configured to obtain information indicating resolving power of the imaging optical system included in the lens apparatus via the communication unit;
a second shake correction unit configured to correct an effect of shake acting on the imaging apparatus on a captured image by moving the image sensor; and
a setting unit configured to set responsiveness of the second shake correction unit based on the information indicating the resolving power of the imaging optical system obtained by the obtaining unit and an imaging condition,
wherein the setting unit is configured to, in a case where the imaging condition satisfies a predetermined condition, set the responsiveness of the second shake correction unit so that the responsiveness is higher in a case where a lens apparatus including a second imaging optical system having higher resolving power than that of a first imaging optical system is attached than in a case where a lens apparatus including the first imaging optical system is attached, and
wherein the predetermined condition is either a condition that the imaging system is set to a burst capture mode or a condition that a light emitting unit is set to emit light during imaging, or both.

19. A lens apparatus to be attached to an imaging apparatus including an image sensor, the lens apparatus comprising:
a communication unit configured to communicate with the imaging apparatus; and at least one processor or circuit which functions as:
an obtaining unit configured to obtain information indicating resolving power of the image sensor included in the imaging apparatus via the communication unit;
a first shake correction unit configured to correct an effect of shake acting on the imaging apparatus on a captured image; and
a setting unit configured to set responsiveness of the first shake correction unit based on the information indicating the resolving power of the image sensor obtained by the obtaining unit and an imaging condition,
wherein the setting unit is configured to, in a case where the imaging condition satisfies a predetermined condition, set the responsiveness of the first shake correction unit so that the responsiveness is higher in a case where the lens apparatus is attached to an imaging apparatus including a second image sensor having higher resolving power than that of a first image sensor than in a case where the lens apparatus is attached to an imaging apparatus including the first image sensor, and
wherein the predetermined condition is either a condition that the imaging system is set to a burst capture mode or a condition that a light emitting unit is set to emit light during imaging, or both.

20. A method for controlling an image stabilization control apparatus, the method comprising:
obtaining resolving power of an imaging system based on information indicating resolving power of an imaging optical system included in a lens apparatus and information indicating resolving power of an image sensor configured to capture an object image formed by the lens apparatus;
controlling a correction unit configured to correct an effect of shake acting on an imaging apparatus to which the lens apparatus is attached on the captured image; and
setting responsiveness of the correction unit controlled by the control unit based on the resolving power of the imaging system and an imaging condition,
wherein, in a case where the imaging condition satisfies a predetermined condition and the resolving power of the imaging system has a first value, the responsiveness of the correction unit is set to be higher than in a case where the resolving power has a second value less than the first value, and
wherein the predetermined condition is either a condition that the imaging system is set to a burst capture mode or a condition that a light emitting unit is set to emit light during imaging, or both.

21. A method for controlling an imaging apparatus to which a lens apparatus including an imaging optical system is attached, the method comprising:
obtaining information indicating resolving power of the imaging optical system included in the lens apparatus by communicating with the lens apparatus;
correcting an effect of shake acting on the imaging apparatus on a captured image by moving an image sensor; and
setting responsiveness of a second shake correction unit based on the information indicating the resolving power of the imaging optical system and an imaging condition,
wherein, in a case where the imaging condition satisfies a predetermined condition, the responsiveness of the second shake correction unit is set so that the responsiveness is higher in a case where a lens apparatus including a second imaging optical system having higher resolving power than that of a first imaging optical system is attached than in a case where a lens apparatus including the first imaging optical system is attached, and
wherein the predetermined condition is either a condition that the imaging system is set to a burst capture mode or a condition that a light emitting unit is set to emit light during imaging, or both.

22. A method for controlling a lens apparatus to be attached to an imaging apparatus including an image sensor, the method comprising:
obtaining information indicating resolving power of the image sensor included in the imaging apparatus by communicating with the imaging apparatus;
correcting an effect of shake acting on the imaging apparatus on a captured image; and
setting responsiveness of a first shake correction unit based on the information indicating the resolving power of the image sensor and an imaging condition,
wherein, in a case where the imaging condition satisfies a predetermined condition, the responsiveness of the first shake correction unit is set so that the responsiveness is higher in a case where the lens apparatus is attached to an imaging apparatus including a second image sensor having higher resolving power than that of a first image sensor than in a case where the lens apparatus is attached to an imaging apparatus including the first image sensor, and
wherein the predetermined condition is either a condition that the imaging system s set to a burst capture mode or a condition that a light emitting unit is set to emit light during imaging, or both.

* * * * *